US011405878B2

(12) United States Patent
Gupta et al.

(10) Patent No.: US 11,405,878 B2
(45) Date of Patent: Aug. 2, 2022

(54) SYSTEM AND METHOD FOR ENERGY EFFICIENT SYNCHRONIZATION IN MESH WIDE AREA NETWORK (WAN) FOR MACHINE-TYPE-COMMUNICATION (MTC) AND INTERNET OF EVERYTHING (IOE) COMMUNICATION

(71) Applicant: QUALCOMM INCORPORATED, San Diego, CA (US)

(72) Inventors: Piyush Gupta, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/529,195

(22) Filed: Aug. 1, 2019

(65) Prior Publication Data
US 2019/0357161 A1 Nov. 21, 2019

Related U.S. Application Data

(63) Continuation of application No. 15/899,363, filed on Feb. 19, 2018, now abandoned.

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0048* (2013.01); *H04W 56/002* (2013.01);
(Continued)

(58) Field of Classification Search
CPC ............... H04W 16/14; H04W 74/006; H04W 74/0833; H04W 74/0875; H04W 28/12;
(Continued)

(56) References Cited

U.S. PATENT DOCUMENTS

2010/0167743 A1 7/2010 Palanki et al.
2014/0328329 A1* 11/2014 Novlan ............. H04W 56/0015
370/336
(Continued)

FOREIGN PATENT DOCUMENTS

CN 107306417 A 10/2017
EP 3099123 A1 11/2016

OTHER PUBLICATIONS

International Search Report and Written Opinion—PCT/US2019/018048—ISA/EPO—dated Apr. 30, 2019 (173967WO).
(Continued)

*Primary Examiner* — Yemane Mesfin
*Assistant Examiner* — Mon Cheri S Davenport
(74) *Attorney, Agent, or Firm* — Smith Tempel Blaha, LLC

(57) ABSTRACT

A method for communication by an edge communication device with a network via a relay communication device includes synchronizing to a network using an initial synchronization signal, associating with a relay communication device, entering a power saving state, awakening from the power saving state, searching for a periodic secondary relay synchronization signal (SRSS) transmitted by the relay communication device using an SRSS search window having a duration longer than a duration of a network search window for searching for the initial synchronization signal, synchronizing to the relay communication device based on the SRSS signal, and transmitting data to the relay communication device based on the synchronizing to enable the relay communication device to relay the data to the network.

28 Claims, 15 Drawing Sheets

(51) Int. Cl.
  *H04W 72/04* (2009.01)
  *H04W 88/04* (2009.01)
  *H04W 4/70* (2018.01)
  *H04W 8/00* (2009.01)

(52) U.S. Cl.
  CPC ....... *H04W 72/0446* (2013.01); *H04W 88/04* (2013.01); *H04W 4/70* (2018.02); *H04W 8/005* (2013.01)

(58) Field of Classification Search
  CPC ....... H04W 28/26; H04W 48/16; H04W 4/02; H04W 52/0229; H04W 52/0274; H04W 56/001; H04W 64/00; H04W 72/042; H04W 72/12; H04W 74/02; H04W 8/24; H04B 7/0695; H04B 1/7087; H04B 1/7156; H04B 2001/71563; H04B 7/0617; H04B 7/0848; H04B 7/088; H04J 11/0079; H04L 5/0048; H04L 5/005; H04L 5/0053; H04L 5/1469; Y02D 30/30; Y02D 70/1226; Y02D 70/21
  See application file for complete search history.

(56) References Cited

U.S. PATENT DOCUMENTS

| | | |
|---|---|---|
| 2016/0183205 A1 | 6/2016 | Li et al. |
| 2016/0212724 A1 | 7/2016 | Seo et al. |
| 2017/0027009 A1 | 1/2017 | Dumpala et al. |
| 2017/0055233 A1 | 2/2017 | Takano |
| 2017/0237515 A1 | 8/2017 | Lee et al. |
| 2018/0227865 A1 | 8/2018 | Tidestav et al. |
| 2019/0261294 A1 | 8/2019 | Gupta et al. |
| 2019/0364492 A1* | 11/2019 | Azizi ................ H04W 52/0264 |

OTHER PUBLICATIONS

Huawei, et al., "Discussion on Synchronization Aspects for feD2D" 3GPP Draft, 3GPP TSG RAN WG1 Meeting #90, Prague, Czech Republic, Aug. 21-25, 2017, 3 Pages.

Samsung: "D2D Synchronization Signal Relay by UE", 3GPP Draft, 3GPP TSG RAN WG1 Meeting #76bis, R1-141314, Shenzhen, China, Mar. 31-Apr. 4, 2014, pp. 1-3.

\* cited by examiner

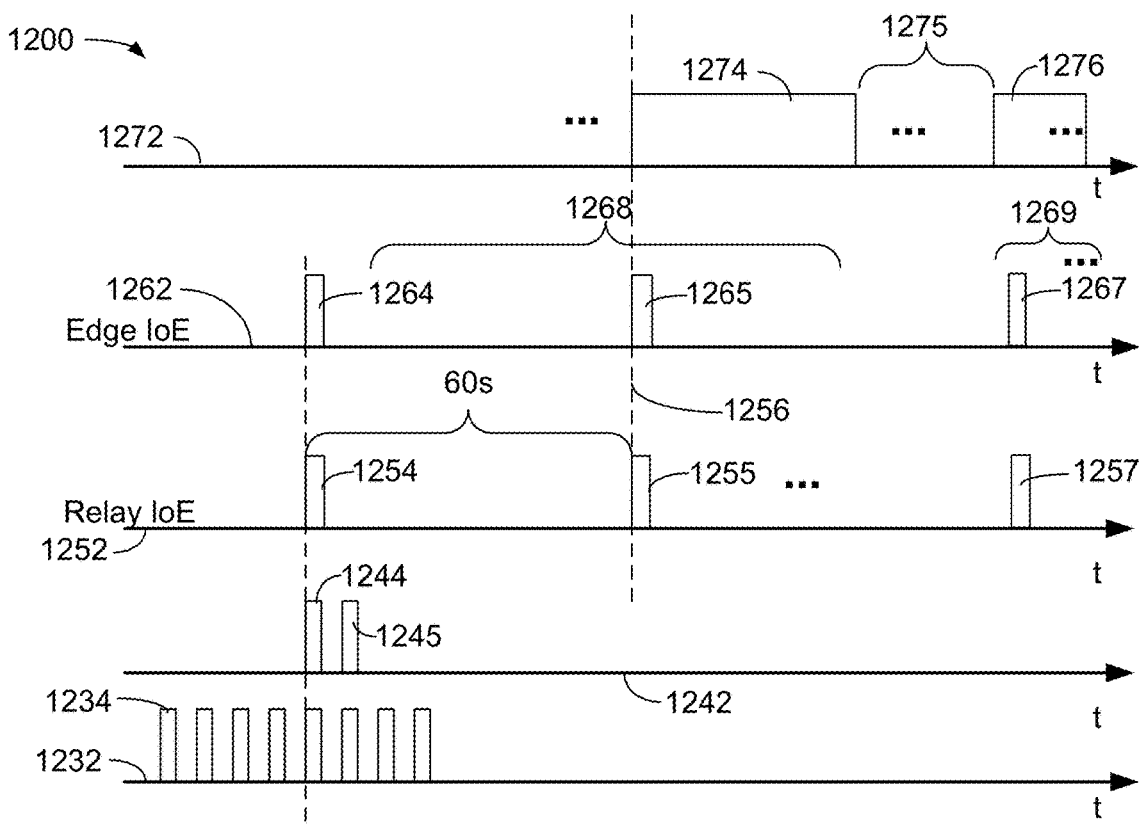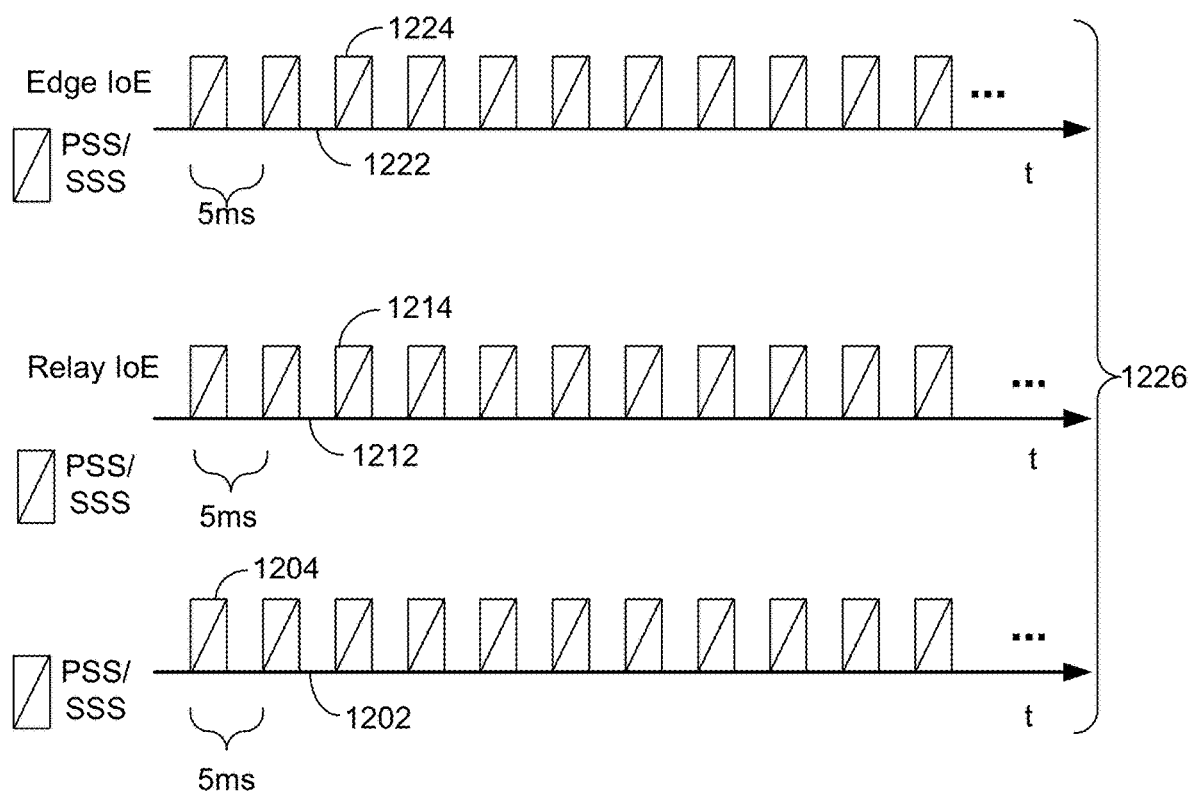
FIG. 12

SYSTEM AND METHOD FOR ENERGY EFFICIENT SYNCHRONIZATION IN MESH WIDE AREA NETWORK (WAN) FOR MACHINE-TYPE-COMMUNICATION (MTC) AND INTERNET OF EVERYTHING (IOE) COMMUNICATION

RELATED APPLICATIONS

This application is a continuation of U.S. patent application Ser. No. 15/899,363 entitled "System And Method For Energy Efficient Synchronization In Mesh Wide Area Network (WAN) For Machine-Type-Communication (MTC) And Internet Of Everything (IOE) Communication," filed Feb. 19, 2018, the contents of which are hereby incorporated into this document by reference in its entirety.

TECHNICAL FIELD

The technology discussed below relates to wireless communication systems, and more particularly, to energy efficient synchronization in mesh wide area network (WAN) machine-type-communication (MTC) and Internet of everything (IoE) communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). An example of an advancement of LTE technology is referred to as 5G. The term 5G represents an advancement of LTE technology including, for example, various advancements to the wireless interface, processing improvements, and the enablement of higher bandwidth to provide additional features and connectivity.

Wireless communications devices, sometimes referred to as user equipment (UE), may communicate with a base station or may communicate directly with another UE. When a UE communicates directly with another UE, the communication is referred to as device-to-device (D2D) communication. In particular use cases, a UE may be a wireless communication device, such as a portable cellular device, or may be a vehicle, such as an automobile, a drone, or may be any other connected device.

A type of communication that sends small amounts of information is referred to as machine-type-communication (MTC). Machine-type-communication generally refers to communications that are characterized by automatic data generation, exchange, processing, and actuation among machines with little or no human intervention.

The Internet of everything (IoE), sometimes also referred to as the Internet of things (IoT), is the inter-networking of physical devices, vehicles (sometimes referred to as "connected devices" and/or "smart devices"), buildings, and other items that may be embedded with electronics, software, sensors, actuators, and network connectivity that enable these objects to collect and exchange data and other information.

A first exemplary IoE use case may be one used for metering, sensing, and other essentially static implementations having light communication traffic, characterized by periodic communications (e.g., temperature/humidity information being transmitted every hour) or sporadic event-driven communications (e.g., reporting a water leak). A typical battery life goal for this first use case may be on the order of multiple years on, for example, 2-AA cells ~5000 mW-hr.

A second exemplary IoE use case may be one used for wearable devices, asset tracking, logistics, etc. and other potentially high mobility implementations having variable length communications that may range from being mostly small communications, to occasional large communications. A typical battery life goal for this second use case may be on the order of a few days on 2-AA cells ~1500 mW-hr.

Therefore, it would be desirable to maximize battery life in these situations, particularly with IoE devices.

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for communication by an edge communication device with a network via a relay communication device including synchronizing to a network using an initial synchronization signal, associating with a relay communication device, entering a power saving state, awakening from the power saving state, searching for a periodic secondary relay synchronization signal (SRSS) transmitted by the relay communication device using an SRSS search window having a duration longer than a duration of a network search window for searching for the initial synchronization signal, synchronizing to the relay communication device based on the SRSS signal, and transmitting data to the relay communication device based on the synchronizing to enable the relay communication device to relay the data to the network.

Another aspect of the disclosure provides an edge communication device capable of communicating with a network via a relay communication device, the edge communication device including a processor, a memory in communication with the processor, wherein the processor and the memory are configured to synchronize to a network using an initial synchronization signal, associate with the relay communication device, enter a power saving state, awaken from the power saving state, search for a periodic secondary relay synchronization signal (SRSS) transmitted by the relay communication device using an SRSS search window having a duration longer than a duration of a network search window for searching for the initial synchronization signal, synchronize to the relay communication device based on the SRSS signal, and transmit data to the relay communication device based on the synchronizing to enable the relay communication device to relay the data to the network.

Another aspect of the disclosure provides an edge communication device including means for synchronizing to a network using an initial synchronization signal, means for associating with a relay communication device, means for entering a power saving state, means for awakening from the power saving state, means for searching for a periodic secondary relay synchronization signal (SRSS) transmitted by the relay communication device using an SRSS search window having a duration longer than a duration of a network search window for searching for the initial synchronization signal, means for synchronizing to the relay communication device based on the SRSS signal, and means for transmitting data to the relay communication device based on the synchronizing to enable the relay communication device to relay the data to the network.

Another aspect of the disclosure provides a non-transitory computer-readable medium storing computer executable code for communication, the code executable by a processor to synchronize to a network using an initial synchronization signal, associate with a relay communication device, enter a power saving state, awaken from the power saving state, search for a periodic secondary relay synchronization signal (SRSS) transmitted by the relay communication device using an SRSS search window having a duration longer than a duration of a network search window for searching for the initial synchronization signal, synchronize to the relay communication device based on the SRSS signal, and transmit data to the relay communication device based on the synchronizing to enable the relay communication device to relay the data to the network.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 12 is a timing diagram in accordance with various aspects of the present disclosure.

DETAILED DESCRIPTION

Figure 1:
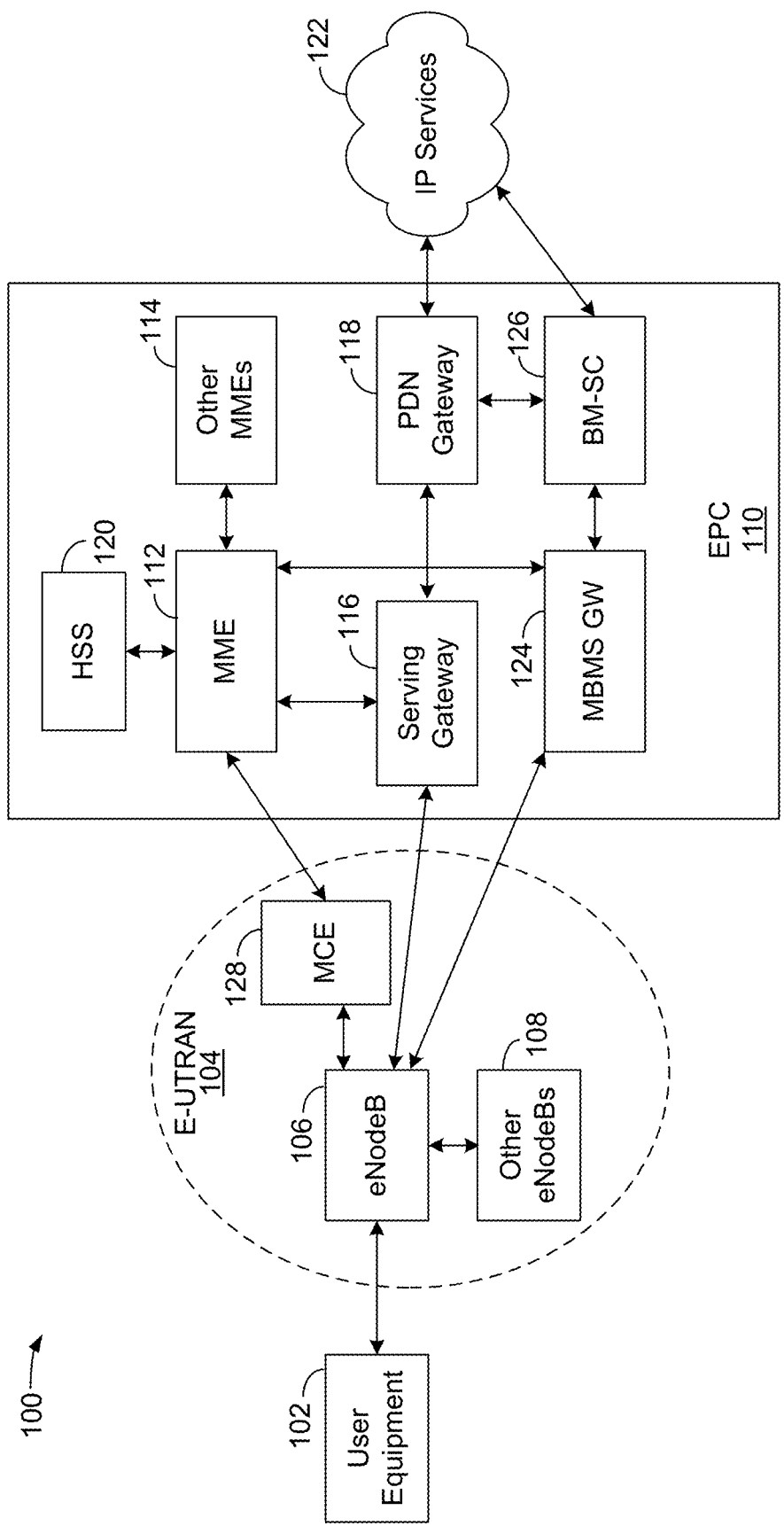
FIG. 1 is a diagram illustrating an example of a network architecture, in accordance with various aspects of the present disclosure.

The word "exemplary" is used herein to mean "serving as an example, instance, or illustration." Any aspect described herein as "exemplary" is not necessarily to be construed as preferred or advantageous over other aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Exemplary embodiments of the disclosure are directed to IoE communications that enable, for example, an IoE device to communicate with another IoE device in an energy efficient manner. In an exemplary embodiment, a "relay" IoE device may be an IoE device that can maintain and establish communication with a network node, such as, for example a base station. In an exemplary embodiment, an "edge" IoE device may be an IoE device that can be configured to communicate with a network node, such as a base station, via a relay IoE device. As used herein, the term IoE device, or Joe communication device, includes an Internet of things (IoT) communication device, a machine type communication (MTC) device, and any other IoE communication device.

In an exemplary embodiment, the edge IoE device may have an unreliable connection with the network node, such as the base station, while the relay IoE device may have a robust connection with the base station. In such an embodiment, the edge IoE device communicates its information to the base station through the relay IoE device. In an exemplary embodiment, the edge IoE device and the relay IoE device obtain initial synchronization with the network node, such as a base station, and thereafter, the edge IoE device may "associate with" or "attach to" the relay IoE device. The relay IoE device may then periodically send a new secondary synchronization signal to the edge IoE device, allowing the edge IoE device to operatively connect with (that is, establish an RRC-Connected connection) the relay device particularly when the edge IoE device has data to send to the base station. In an exemplary embodiment, the new secondary synchronization signal sent by the relay IoE device may have a period that is significantly longer than a period of an initial synchronization signal. In an exemplary embodiment, after the edge IoE device sends its data via the relay IoE device, the edge IoE device may enter a power saving mode until the next time it determines that it has data to send to the network node, at which time the edge IoE device would again synchronize to the relay IoE device using the new secondary synchronization signal.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services; however, as those skilled in the art will readily appreciate, the various concepts presented throughout this disclosure may be extended to networks providing circuit-switched services. Moreover, while an LTE network is illustrated as an example, other types of networks may also be used, including, for example only, a 5G network.

The E-UTRAN 104 includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. In an exemplary embodiment of a 5G communication network, the eNB 106 may be referred to as a gNodeB (gNB). The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110, and in an exemplary embodiment, may provide non-access stratum (NAS) signaling to the eNB 106. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
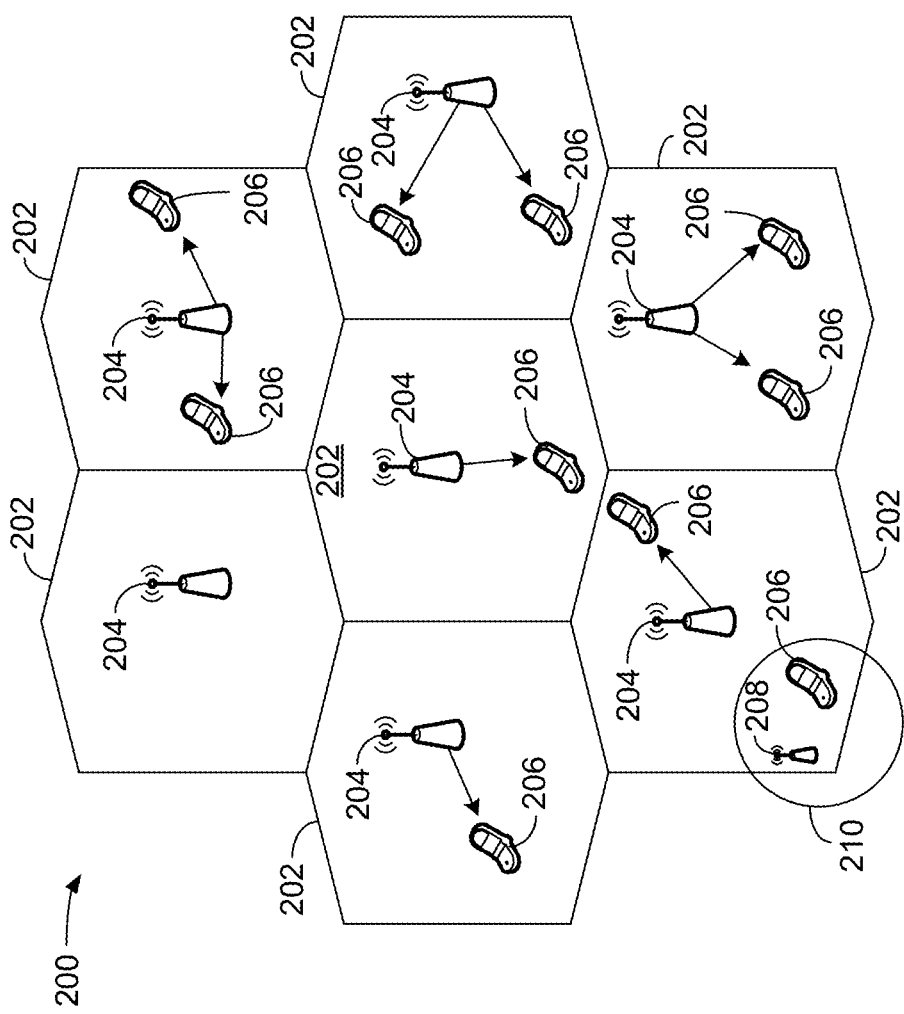
FIG. 2 is a diagram illustrating an example of an access network, in accordance with various aspects of the present disclosure.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "gNB" "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO), Ultra Mobile Broadband (UMB), 5G, or other modulation and multiple access techniques. EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
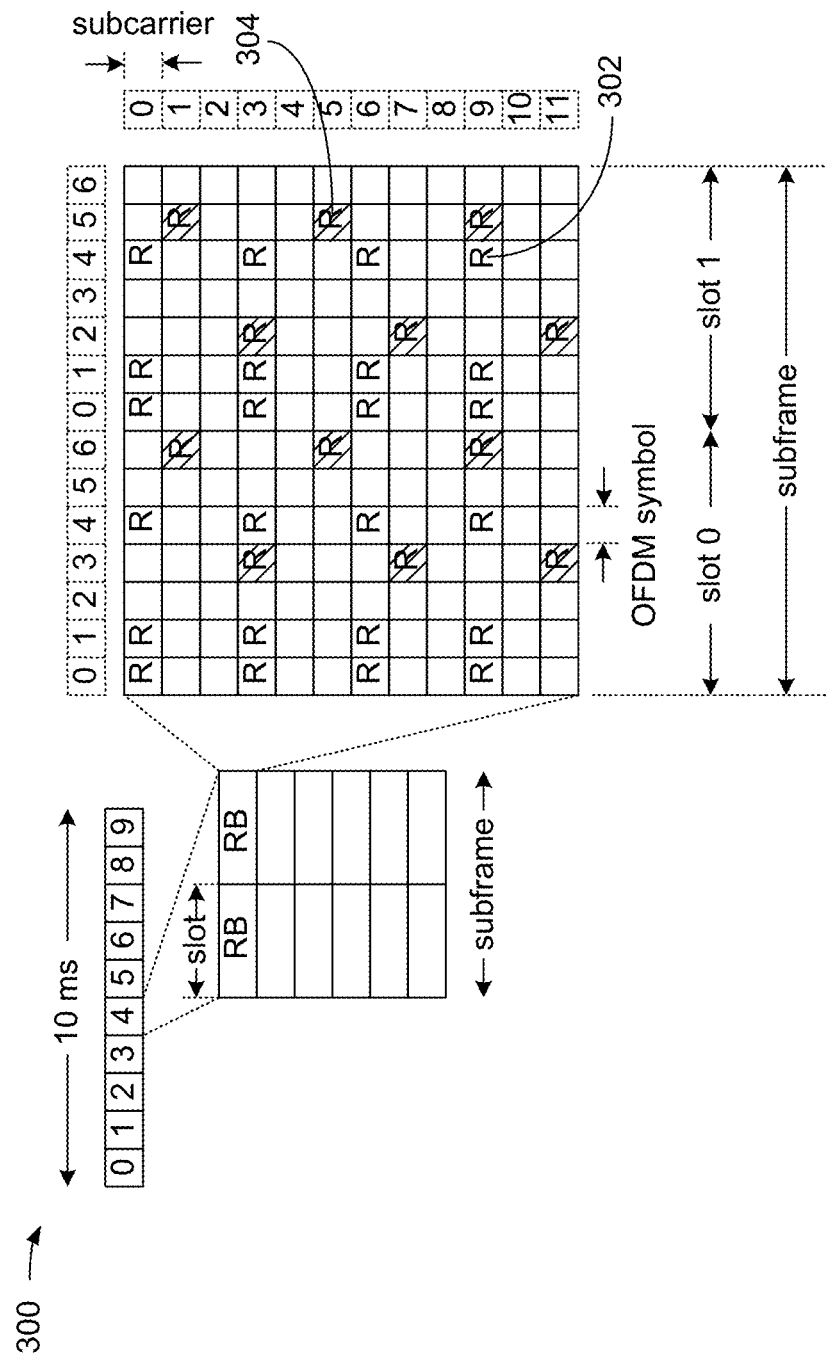
FIG. 3 is a diagram illustrating an example of a DL frame structure in LTE, in accordance with various aspects of the present disclosure.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
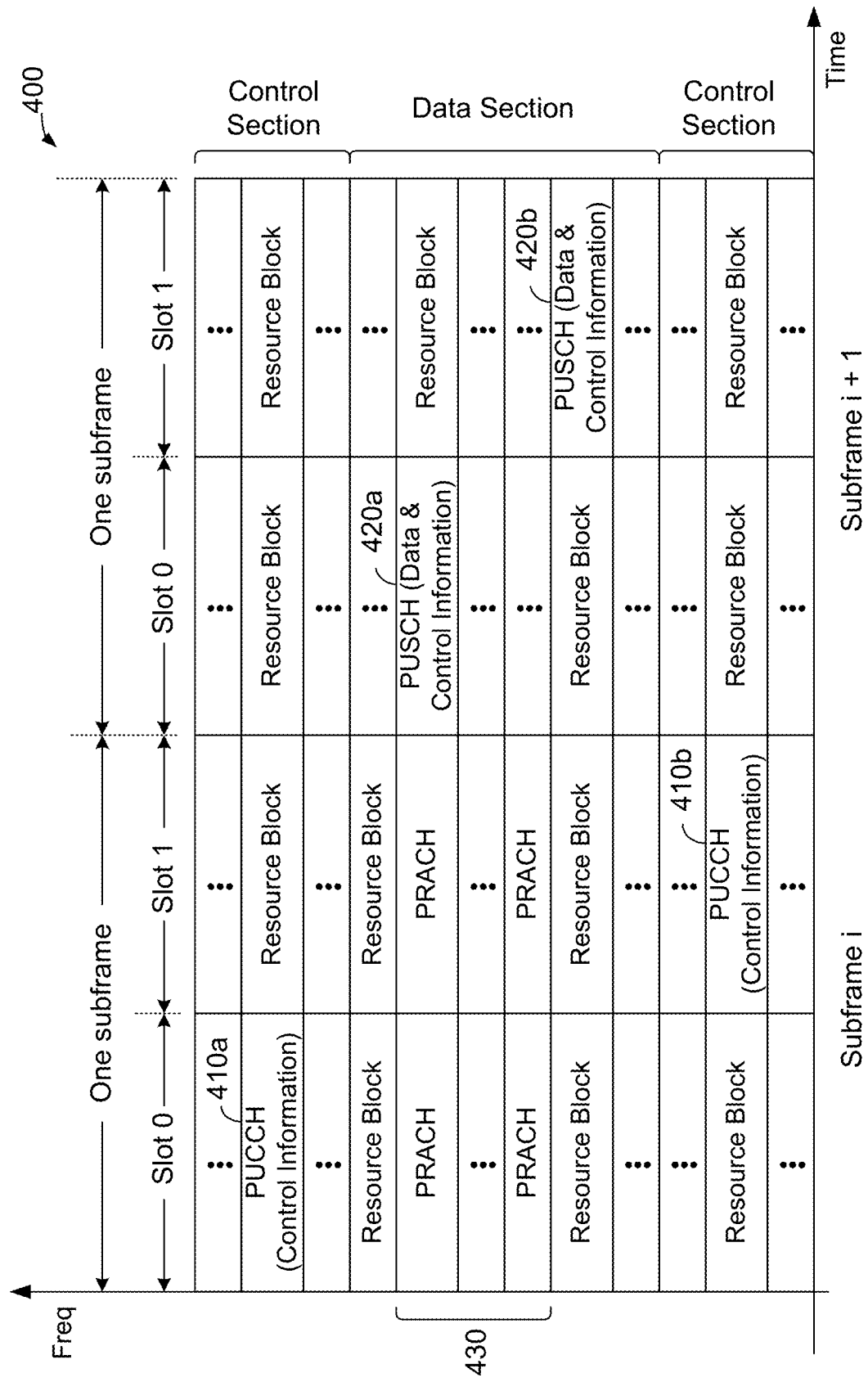
FIG. 4 is a diagram illustrating an example of an UL frame structure in LTE, in accordance with various aspects of the present disclosure.

FIG. 4 is a diagram 400 illustrating an example of an UL frame structure in LTE. The available resource blocks in the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

A described herein in accordance with exemplary embodiments of the present disclosure, initial symbols in the PRACH 430, or, if appropriate, a modified PRACH or NPRACH, or initial symbols in the PUSCH 420, or, if appropriate, a modified PUSCH or NPUSCH, can be used by the UE to send small data transmissions for eMTC communications and/or IoT communications prior to the establishment of a radio resource control (RRC) radio communication link between a UE and a base station. As used herein, the term (N)PRACH can be used to refer to a wideband PRACH and/or a narrowband NPRACH and the term (N)PUSCH can be used to refer to a wideband PUSCH and/or a narrowband NPUSCH.

Figure 5:
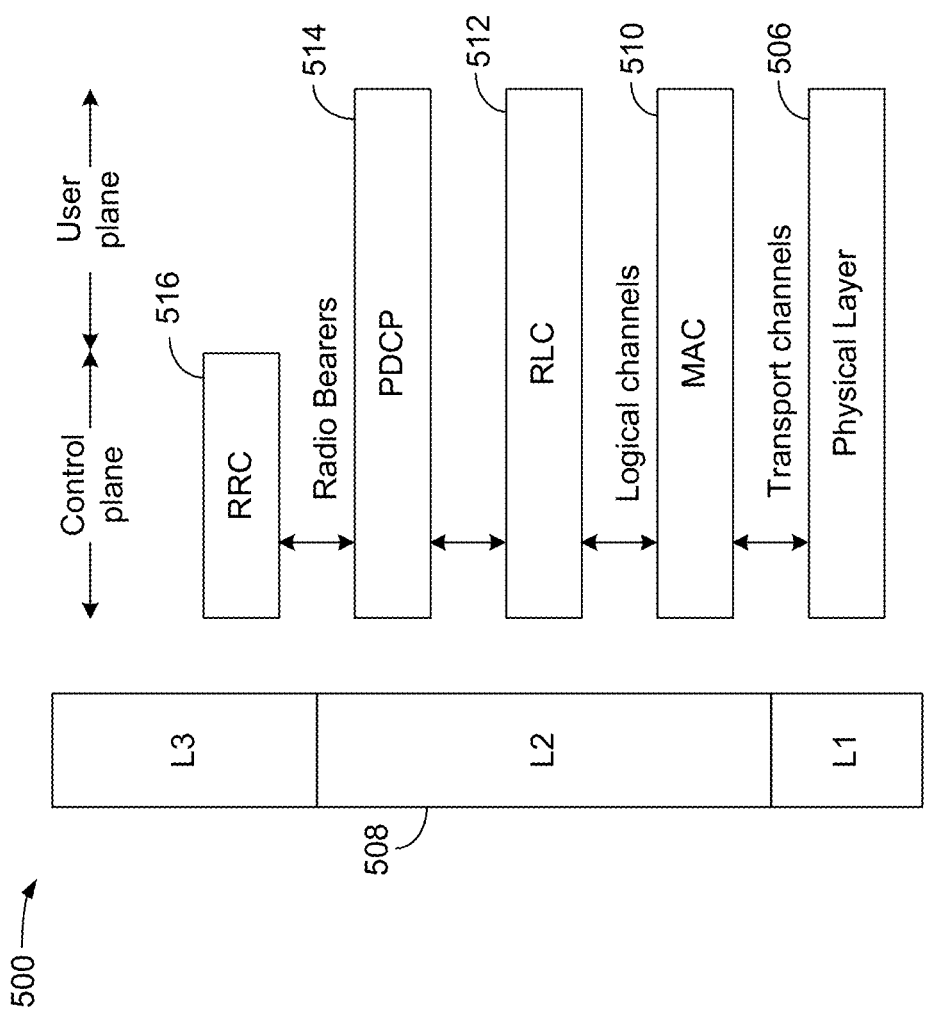
FIG. 5 is a diagram illustrating an example of a radio protocol architecture for the user and control planes in accordance with various aspects of the present disclosure.

FIG. 5 is a diagram 500 illustrating an example of a radio protocol architecture for the user and control planes in LTE in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
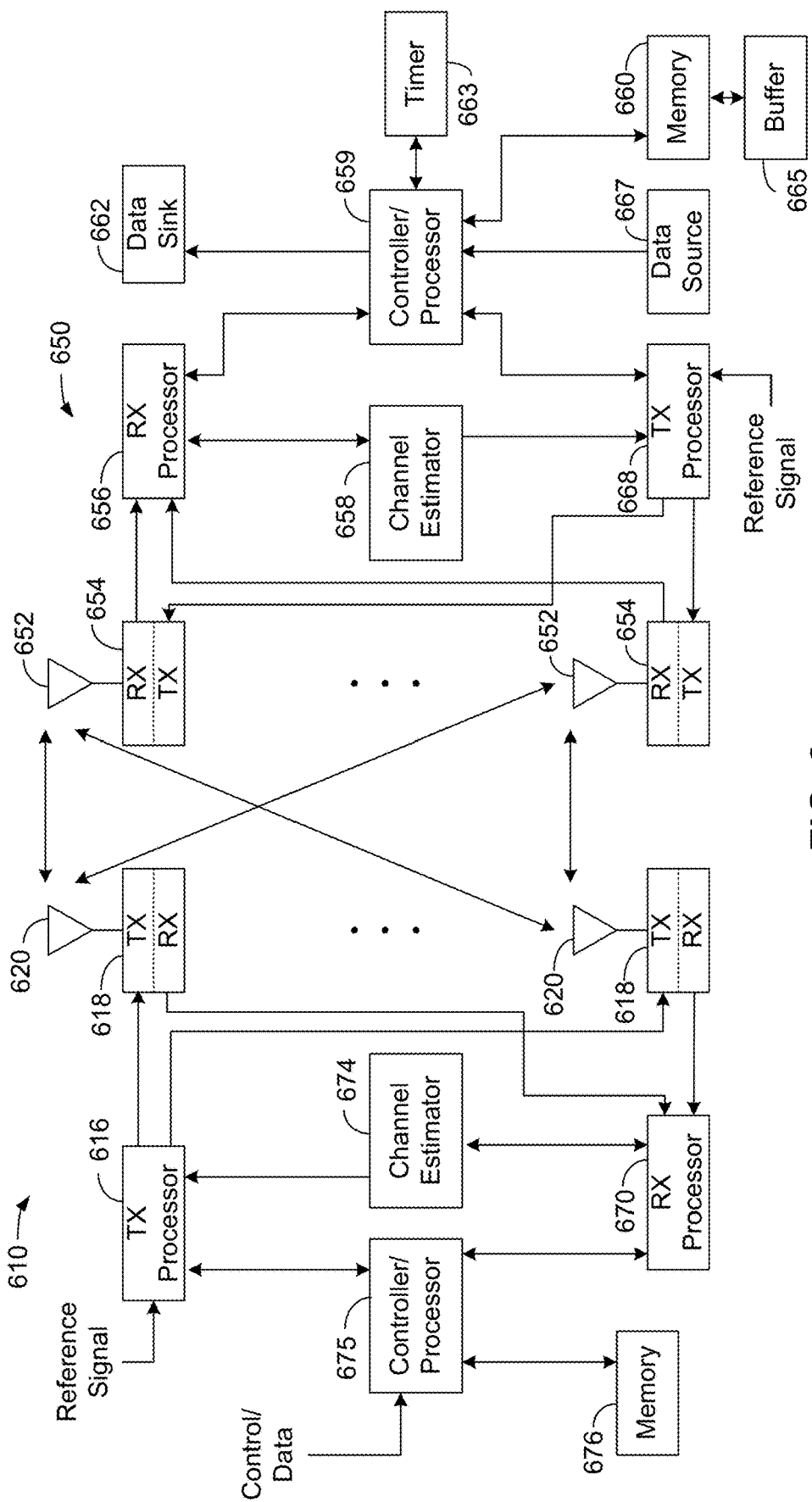
FIG. 6 is a diagram illustrating an example of an evolved Node B and user equipment in an access network in accordance with various aspects of the present disclosure.

FIG. 6 is a block diagram of an eNB 610 in communication with a UE 650 in an access network in accordance with various aspects of the present disclosure. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In an exemplary embodiment, the UE 650 may include a timer 663 operatively coupled to the controller/processor 659. In an exemplary embodiment, the timer 663 may be configured as a contention resolution timer 663 that may be configured to determine communication signal contention when the UE 650 transmits to a base station in Msg1 or in Msg3, as described herein.

In an exemplary embodiment, the UE 650 may include a buffer 665 operatively coupled to the memory 660. In an exemplary embodiment, the buffer 665 may be configured as a Msg3 buffer that may be configured to store Msg3 communications during periods when the UE 650 may be performing contention resolution when transmitting data in Msg1 or Msg3, as described herein.

In an exemplary embodiment, one or both of the eNB 610 and the UE 650 may have logic, software, firmware, configuration files, etc., to allow the MCT/IoT/IoE communications described herein.

Figure 7:
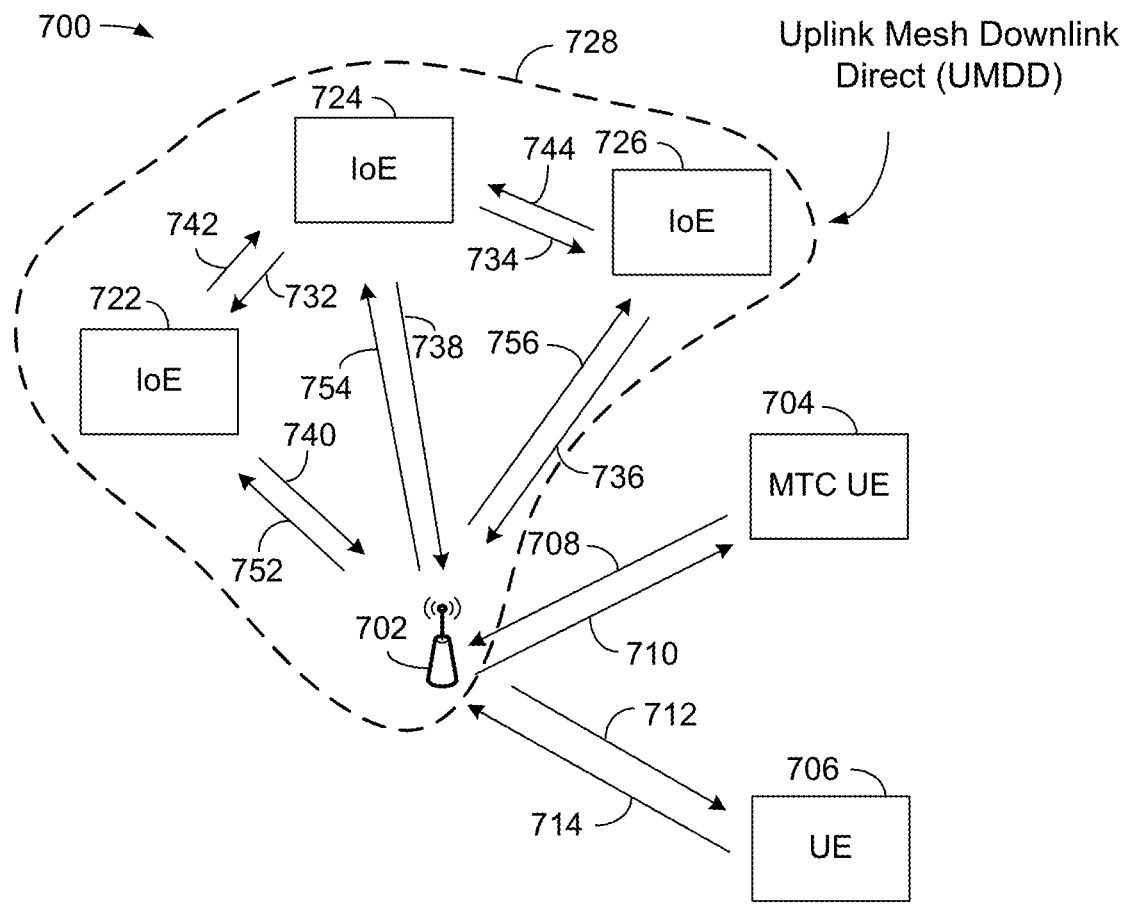
FIG. 7 is a diagram illustrating a communication system in accordance with various aspects of the present disclosure.

FIG. 7 is a diagram 700 illustrating a communication system in accordance with various aspects of the present disclosure. FIG. 7 includes a node 702, an MTC UE 704, and a UE 706 (also referred to as a "non-MTC UE"). The node 702 can be a macro node (e.g., an eNB/gNB), femto node, pico node, or similar base station, a mobile base station, a relay, a UE (e.g., communicating in peer-to-peer or ad-hoc mode with another UE), a portion thereof, and/or substantially any component that communicates control data in a wireless network. The MTC UE 704 and non-MTC UE 706 can each be a mobile terminal, a stationary terminal, a modem (or other tethered device), a portion thereof, and/or substantially any device that receives control data in a wireless network.

As shown in FIG. 7, the MTC UE 704 receives DL transmissions 710 from eNB 702 and sends UL transmissions 708 to the eNB 702. In one aspect, the DL and UL transmissions 710 and 708 may include either MTC control information or MTC data. As further shown in FIG. 7, the UE 706 receives DL transmissions 712 from eNB 702 and sends UL transmissions 714 to the eNB 702.

The node 702 may also be in communication with one or more IoE devices 722, 724 and 726. In an exemplary embodiment, three IoE devices 722, 724 and 726 are shown in FIG. 7 for simplicity, as more or fewer IoE devices may be in communication with the node 702 and with each other. In an exemplary embodiment, the IoE devices 722, 724 and 726, and the other IoE devices described herein, may be exemplary embodiments of a UE 650.

In an exemplary embodiment, the IoE devices 722, 724 and 726 may be configured in what is referred to an uplink mesh downlink direct (UMDD) network 728. In an exemplary UMDD network 728, uplink communication channels 732, 734, 736, 738, 740, 742 and 744 may be established between an IoE device and the node 702, and downlink communication channels 752, 754 and 756 may be established directly from the node 702 to the respective IoE device. For example, for uplink communications, the IoE device 722 may communicate directly with the node 702 over uplink communication channel 740, the IoE device 724 may communicate directly with the node 702 over uplink communication channel 738, and the IoE device 726 may communicate directly with the node 702 over uplink communication channel 736. However, in an exemplary mesh architecture, the IoE device 724 may also or alternatively communicate with the IoE device 722 over uplink communications channel 732, the IoE device 722 may also or alternatively communicate with the IoE device 724 over uplink communications channel 742, the IoE device 724 may also or alternatively communicate with the IoE device 726 over uplink communications channel 734, and the IoE device 726 may also or alternatively communicate with the IoE device 724 over uplink communications channel 744. Any of the IoE devices 722, 724 and 726 may "relay" these uplink communications from other IoE devices to the node 702 over uplink communications channel 740, 738 and 736, respectively. In this manner, for uplink communications, the IoE devices 722, 724 and 726 may interoperate to take advantage of optimum uplink communication channels to communicate with the node 702.

In an exemplary embodiment, a WAN downlink provides network-wide synchronization from a base station, the node 702 to a number of IoE devices, in this example, IoE devices 722, 724, and 726. A large coverage area, such as that shown by the network 728 may have a maximum coupling loss (MCL) on the order of 164 dB, which may be met through repeating the transmission of synchronization messages from the base station 702 to the IoE devices 722, 724, and 726, in this example. For example, in narrow band (NB) Internet of Things (IoT) (NB-IoT) communications, a primary synchronization signal (PSS) can occur over hundreds of milliseconds (ms), with an example synchronization signal period of 5 ms, thereby making energy efficient synchronization important.

An edge IoE device (i.e., an IoE device that is located on the edge of a communication network) should be awake for a sufficiently long duration of time to acquire the primary synchronization signal. Infrequent traffic, e.g., on the order of once every hour, and potentially larger clock drift due to cost reduction typically means this overhead can have significant negative impact on battery life of the IoE device.

Figure 8:
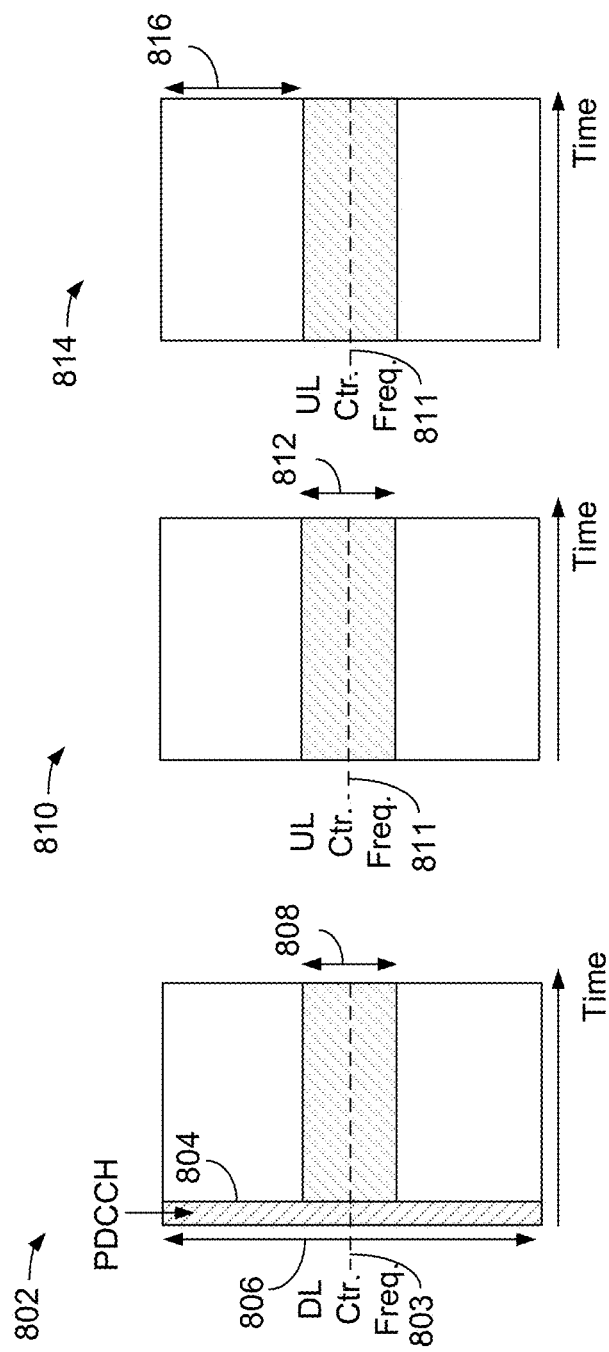
FIGS. 8A, 8B and 8C are diagrams illustrating narrowband operation of MTC UEs in a large bandwidth allocated for non-MTC UEs in accordance with various aspects of the present disclosure.

FIGS. 8A through 8C are diagrams 802, 810, and 814 illustrating narrowband operation of IoE devices and MTC UEs in a large bandwidth allocated for non-MTC UEs in accordance with various aspects of the present disclosure. While FIGS. 8A, 8B and 8C illustrate the concept of narrowband communications, the IoE devices and MCT-UEs may also communicate over large bandwidth, and may communicate directly with each other over sidelink communication resources, as known to those having ordinary skill in the art. FIG. 8A shows a large bandwidth 806 allocated for non-MTC UEs and further shows a DL center frequency 803. Accordingly, the DL operates in the center of the large bandwidth 806. In the configuration of FIG. 8A, shaded portion 804 is reserved for PDCCH. As further shown in FIG. 8A, narrow bandwidth 808 can be used for both UL and DL and can be used for a primary synchronization signal (PSS), secondary synchronization signal (SSS), physical broadcast channel (PBCH), SIB, and/or paging. For example, the narrow bandwidth can be 1.25 MHz. FIG. 8B shows a UL center frequency 811 and the narrow bandwidth 812. For example, UL random access channel (RACH) messages (e.g., message 1 and message 3) can be communicated by MTC UEs in the UL center frequency 811 to facilitate access to the network. As shown in FIG. 8C, other UL transmissions can be communicated in a bandwidth different from narrow bandwidth 808, such as bandwidth 816. It should be understood that in FIGS. 8A through 8C, the small bandwidth 808 can be located in a region other than the center of the large bandwidth 806.

In a specific example, LTE allows the following transmission modes (TMs): TM1 for single antenna port, TM2 for transmit diversity, TM3 for open loop MIMO, TM4 for close loop MIMO, TM5 for multi-user MIMO, TM6 for single layer closed loop MIMO, TM7 for single layer beamforming with dedicated reference signal (RS), TM8 for dual layer beamforming with dedicated RS, TM9 for MIMO with up to 8 layer transmissions, and TM10 for coordinated multiple point (CoMP). For SIB/MIB transmission, as well as message 2 and message 4 for RACH, the default transmission modes are used: TM1 is used for single and TM2 is used for 2 transmit (Tx) antennas or 4 Tx antennas. The UE can be switched to another transmission mode based on UE specific radio resource control (RRC) signaling.

MIB or physical broadcast channel (PBCH) can contain various information bits, such as bandwidth information bits, physical HARQ indicator channel (PHICH) configuration bits, and SFN bits. The bandwidth information can be four bits; however, such bandwidth information may not be needed for MTC when narrowband operation is used. The PHICH configuration bits can be three bits (e.g., one bit for duration, two bits for PHICH group). However, such PHICH configuration may not be needed if NCT is used or if a fixed control region for PBCH subframe is used. The SFN bits can be eight bits of the most significant bits (MSB) (the other 2 bit from blind decoding of PBCH in 40 ms). The SFN bits can be signaled later in the payload. Antenna information can be conveyed by another signal. PBCH transmission matches around 4 antenna ports, space frequency block code (SFBC) or SFBC-frequency switched transmit diversity (FSTD) is used for antenna numbers of 2 or 4. Combined with 4 timing hypothesis and 3 antenna hypothesis, a total of 12 blind decoding is needed for current PBCH decoding.

Therefore, in order to reduce costs, MTC can be operated in a narrow band, e.g. six resource blocks (RBs). Considering cost saving as well as limited requirement on the data rate, the transmission mode can be restricted only to those without the support of spatial multiplexing.

Figure 9:
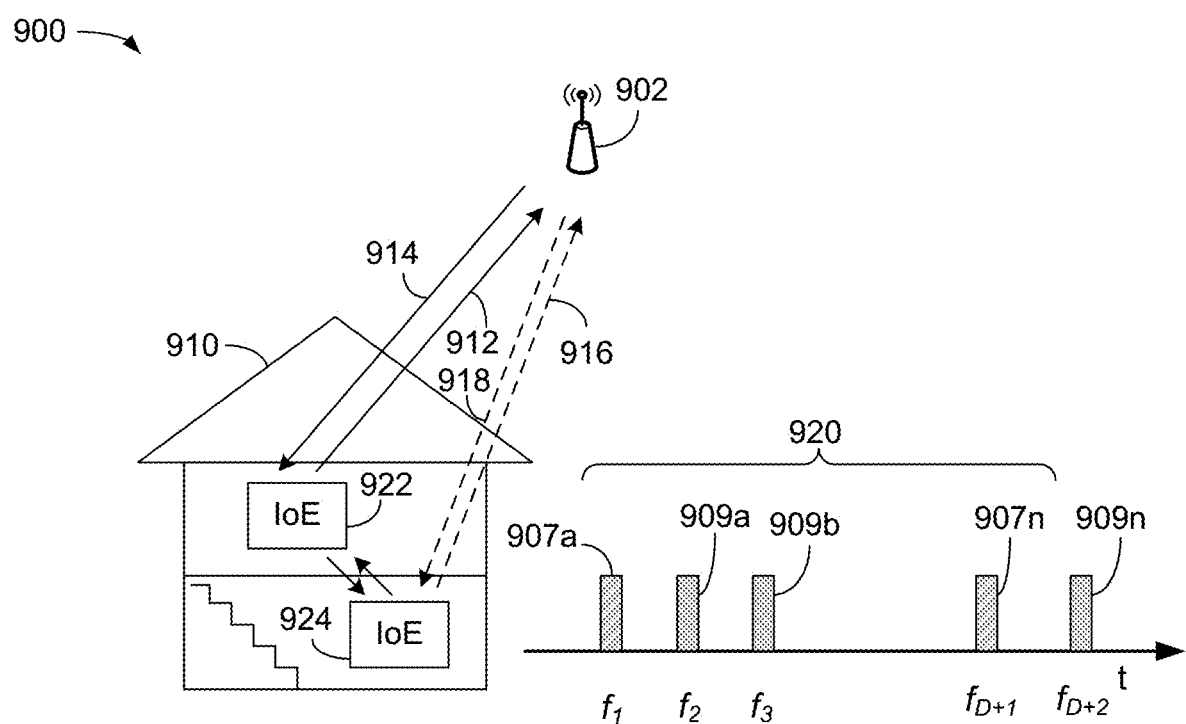
FIG. 9 is a diagram showing an exemplary embodiment of a communication system in accordance with various aspects of the present disclosure.

FIG. 9 is a diagram showing an exemplary embodiment of a communication system 900 in accordance with various aspects of the present disclosure. In an exemplary embodiment, the communication system 900 comprises a node 902, which may be a base station (e.g., an eNB, a gNB, etc., or another device associated with a communication network), and IoE devices 922 and 924 located, for example, in a dwelling 910. In an exemplary embodiment, the IoE device 924 may be located in a coverage-challenged location, such as, for example, a building basement. In such a location, an IoE device, such as the IoE device 924, may have difficulty communicating with the base station 902. In an exemplary embodiment, the IoE device 924 may be configured to have the ability to relay its data through an IoE device that may have a more robust connection with the base station 902. For example, a better-located IoE device, such as the IoE device 922, may have a robust communication link to the base station 902. In this example, the IoE device 922 may be referred to as a "relay" IoE device and the IoE device 924 may be referred to as an "edge" IoE device. Various traffic modes may support a completely base station-controlled traffic mode to a completely-distributed scheduling communication mode.

A period of time when all IoE devices are awake, for example, a common awake period, may be referred to as a "discovery period" 920 during which an IoE device may connect to another IoE device or to a network. Discovery broadcast messages 907a, through 907n, and data messages 909a, 909b and 909n, are shown on a timeline, t, where the period, D, of the discovery broadcast messages 907a through 907n are shown as being less frequent than the period data messages 909a, 909b, and 909n. In FIG. 9, "D" indicates the period of the discovery frame in terms of data-frame slots, i.e., discovery occurs every D data frames. Hence, the discovery broadcast message 907a may occur in a first frame, $f_1$, and the next discovery broadcast message, 907n, would occur in frame $f_{D+1}$, and so on. Similarly, a data message 909a may occur in a first frame, $f_2$, and the data message, 909n, would occur in frame $f_{D+2}$.

In an exemplary embodiment, a periodic broadcast from a relay IoE device, such as the IoE device 922 in the common discovery period allows another IoE device, such as the IoE device 924, to discover potential relay IoE devices and their capabilities. Similarly, in an exemplary embodiment, a periodic broadcast from an edge IoE device, such as the IoE device 924 in the common discovery period allows another IoE device, such as the relay IoE device 922, to discover potential edge IoE devices. In FIG. 9 as an example, the IoE device 922 may have a strong communication link with the base station 902, shown using uplink communication channel 912 and downlink communication channel 914, and may therefore act as a relay IoE device 922 for the coverage-challenged IoE device 924, which may have a weak or non-existent communication link with the base station 902, as shown by the dotted lines 916 and 918.

Figure 10:
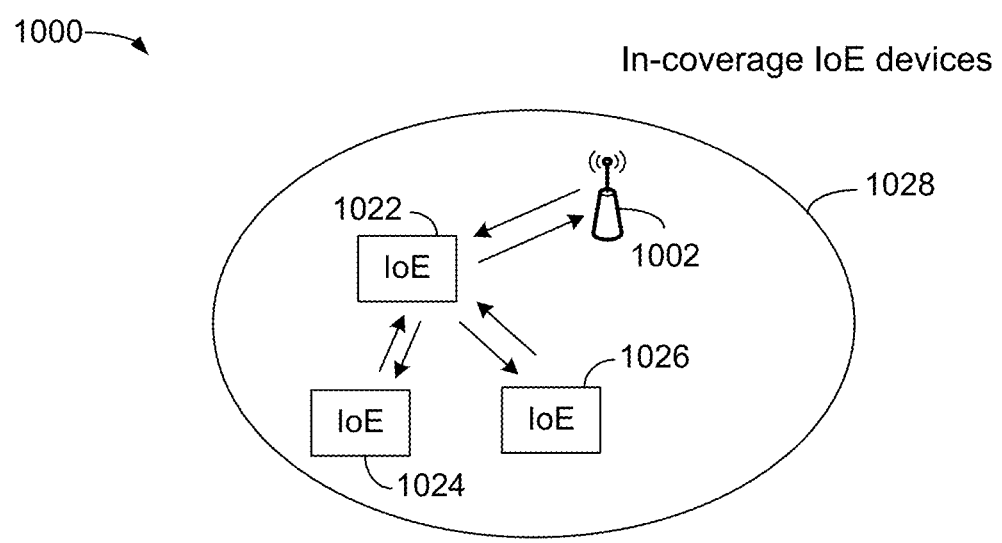
FIG. 10 is a diagram showing an exemplary embodiment of a communication system in accordance with various aspects of the present disclosure.

FIG. 10 is a diagram showing an exemplary embodiment of a communication system 1000 in accordance with various aspects of the present disclosure. The communication system 1000 is an exemplary embodiment of IoE device synchronization signal relaying. In an exemplary embodiment, the communication system 1000 comprises a node 1002, which may be a base station, or another communication system node, and IoE devices 1022, 1024 and 1026. In an exemplary embodiment, the IoE device 1022 may be a "relay" IoE device and the IoE devices 1024 and 1026 may be "edge" IoE devices.

In an exemplary embodiment, for the IoE device 1024 and the IoE device 1026, a synchronization signal may be broadcast from the relay IoE device 1022 to provide energy-efficient synchronization in a coverage area 1028. In this exemplary embodiment, all of the IoE devices 1022, 1024 and 1026 are located within the coverage area 1028, and therefore, all of the IoE devices 1022, 1024 and 1026 may be capable of establishing an initial synchronization with the network with which the node 1002 is associated. For example, the node 1002, which may be a base station, may provide initial synchronization via a primary synchronization signal (PSS) and a secondary synchronization signal (SSS), in accordance with LTE, 5G, or other network protocols and standards.

In an exemplary embodiment, the relay IoE device 1022, the edge IoE device 1024 and the edge IoE device 1026, may receive an initial sync/MIB/SIB (synchronization signal/master information block (MIB)/system information block (SIB)) directly from the base station 1002.

After this initial synchronization, the relay IoE device 1022, the edge IoE device 1024 and the edge IoE device 1026 may perform a discovery process, for example, using discovery broadcast messages 907a through 907n of FIG. 9, to discover other IoE devices. In particular, the edge IoE device 1024 and the edge IoE device 1026 may discover whether a suitable "relay" IoE device, such as IoE device 1022, may be available.

In an exemplary embodiment, after an edge IoE device, such as IoE device 1024, associates with a relay IoE device, such as IoE device 1022, the edge IoE device 1024 may start relaying traffic through the relay IoE device 1022, which acts as a relay device to the node 1002 for the edge IoE device 1024. In an exemplary embodiment, the relay IoE device 1022 broadcasts a periodic secondary relay synchronization signal (SRSS) to the edge IoE device 1024 (and to all edge IoE devices that may be associated with the relay IoE device 1022). The period of the secondary relay synchronization signal (SRSS) sent by the relay IoE device 1022 may be longer that the period of the primary synchronization signal (PSS)/secondary synchronization signal (SSS) that is used to establish initial synchronization with a base station. For example, the secondary relay synchronization signal (SRSS) may be broadcast by the relay IoE device 1022 using a period that is longer than a period of the initial primary synchronization signal (PSS)/secondary synchronization signal (SSS) signals. In an exemplary embodiment, the SRSS may be broadcast every 60 seconds (s), to improve energy efficiency. Given the longer period of the secondary relay synchronization signal (SRSS) compared to the primary synchronization signal (PSS)/secondary synchronization signal (SSS) that are used to establish initial synchronization with a base station, the secondary relay synchronization signal (SRSS) may be designed for a "one-shot" or "one-time" synchronization process, where an edge IoE device 1024 may have a single chance, or opportunity, within a predefined time window to receive and decode the secondary relay synchronization signal (SRSS) broadcast by the relay IoE device 1022. In this example, the edge IoE device 1024 may have one chance every 60 s in which to receive and decode the secondary relay synchronization signal (SRSS) sent by the relay IoE device 1022. Due to a possible large clock offset between the relay IoE device 1022 and the edge IoE device 1024, and the longer period (more infrequent) of the secondary relay synchronization signal (SRSS), the edge IoE device 1024 may employ a longer search window to search for the SRSS signal than would an edge IoE device not communicating with a relay IoE device. In an exemplary embodiment, an edge IoE device may be in a sleep cycle and when it has data to send, would awaken and search for the SRSS in this longer search window. In an exemplary embodiment, particularly if data traffic is infrequent, an edge IoE device may awaken even when it has no data to transmit to receive the SRSS from the relay IoE device 1022 to prevent excessive timing and frequency drift.

In an exemplary embodiment, the relay IoE device 1022 need not always send a secondary relay synchronization signal (SRSS). For example, the relay IoE device 1022 sends a secondary relay synchronization signal (SRSS) only once an edge IoE device (such as IoE device 1024), which can benefit from the secondary relay synchronization signal (SRSS), associates with the relay IoE device 1022.

In an exemplary embodiment, in addition to synchronization, a relay IoE device 1022 also may relay downlink (DL) paging communications from the base station 1002 to an edge IoE device. In this exemplary embodiment, synchronization may occur according to the same rate as does DL paging from a base station. For example, the application layer of the relay IoE device 1022 may be configured to check IoE device status periodically, which will result in a base station (eNB, gNB, etc., for example, node 1002) paging the relay IoE device 1022 using a DL paging signal. If the rate of this DL paging signal is faster than the rate of the SRSS, then the SRSS can be sent at the same rate as the DL paging signal, as the relay IoE device 1022 would transmit at the rate of the DL paging signal, in this example. The application layer in the relay IoE device 1022 may be configured to periodically check the relay IoE device 1022 status, which will result in a base station 1002 paging the relay IoE device 1022. If this DL paging frequency (or period) is faster than the period of the SRSS, then the SRSS can be broadcast at the paging rate, as the relay IoE device 1022 would transmit at the rate of the DL paging signal, in this example. DL paging originates from the base station 1002 (eNB, gNB, etc.) based on the base station's application layer configuration. In this exemplary embodiment, the paging signal is sent from the base station 1002 to the relay IoE device 1022, which forwards it to the edge IoE device 1024 or 1026. In this exemplary embodiment, the relay node (relay IoE device 1022) awakens to receive the base station's (eNB, gNB, node 1002) paging signal, and forwards that paging signal to the edge IoE device or devices, so, in this example, the relay IoE device 1022 can forward the SRSS as well as the DL paging signal to one or more of the edge IoE device 1024 and/or the edge IoE device 1026.

A tradeoff of broadcasting SRSS from the relay IoE device 1022 in this embodiment is a longer acquisition time from the base station 1002 (eNB, gNB, etc.) when using PSS/SSS repetition from the base station 1002 versus a larger offset when using SRSS from the relay IoE device 1022, but much better signal-to-noise ratio (SNR) being obtained by using SRSS from the relay IoE device 1022. For example, for a carrier frequency offset (CFO) of 20 ppm, a period of 60 s for the secondary relay synchronization signal (SRSS) corresponds to a search window of 24 ms versus a search window of >200 ms when using the base station PSS/SSS repetition for a maximum coupling loss (MCL) of 164 dB, in this example. Therefore, a sizable reduction in synchronization energy overhead is realized when using the secondary relay synchronization signal (SRSS) to synchronize an edge IoE device to a relay IoE device.

Figure 11:
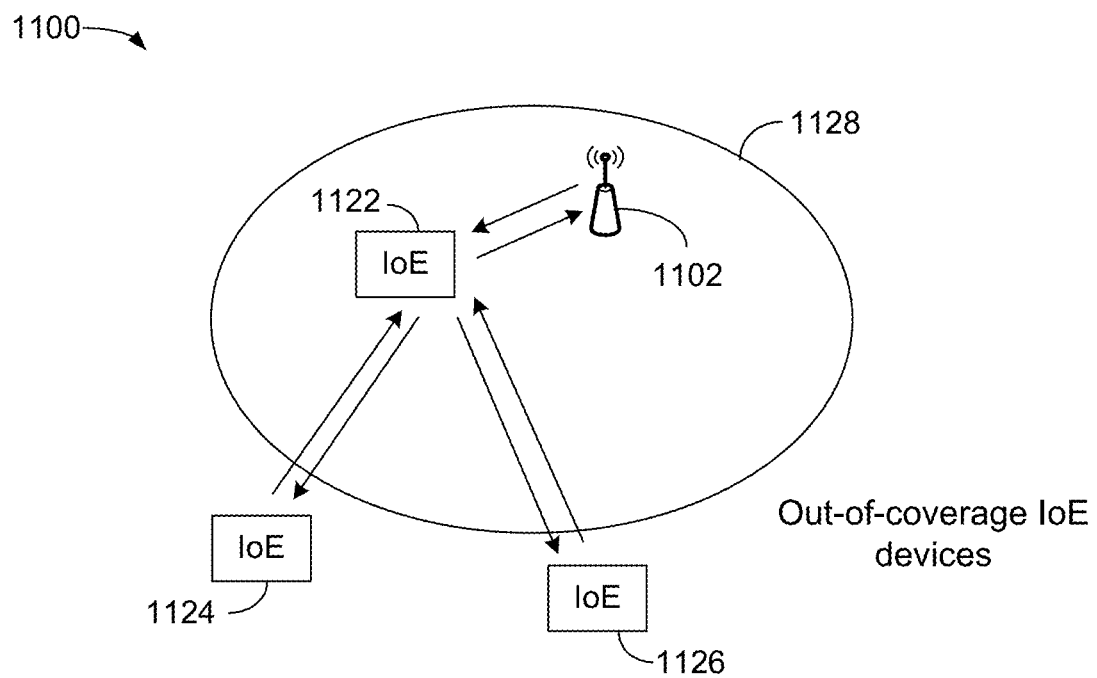
FIG. 11 is a diagram showing an exemplary embodiment of a communication system in accordance with various aspects of the present disclosure.

FIG. 11 is a diagram showing an exemplary embodiment of a communication system 1100 in accordance with various aspects of the present disclosure. The communication system 1100 is an exemplary embodiment of IoE device synchronization signal relaying. In an exemplary embodiment, the communication system 1100 comprises a node 1102, which may be a base station, or another communication system node, and IoE devices 1122, 1124 and 1126. In an exemplary embodiment, the IoE device 1122 may be a "relay" IoE device and the IoE devices 1124 and 1126 may be "edge" IoE devices.

In an exemplary embodiment, for the IoE device 1124 and the IoE device 1126, a synchronization signal may be relayed from the relay IoE device 1122 to provide energy-efficient synchronization when the edge IoE device 1124 and the edge IoE device 1026 may be located outside of a coverage area 1128. In this exemplary embodiment, the relay IoE device 1122 may be located within the coverage area 1128 and may be capable of establishing an initial connection with the network with which the node 1102 is associated.

In this exemplary embodiment, the IoE device 1124 and the IoE device 1216 are located outside of the coverage area 1128, so it may be difficult for the IoE devices 1124 and 1126 to establish an initial connection with the network with which the node 1102 is associated. In this exemplary embodiment, the initial search window for the IoE devices 1124 and 1126 may be established to allow the IoE devices 1124 and 1126 to receive the PSS/SSS initial synchronization signals from the node 1102, the initial search window being larger than if the IoE devices 1124 and 1126 were located within the coverage area 1128; however, this still may not allow the IoE devices 1124 and 1126 to receive the PSS/SSS initial synchronization signals from the node 1102. In an alternative exemplary embodiment, the relay IoE device 1122 may be configured to send an initial sync/MIB/SIB (synchronization signal/master information block (MIB)/system information block (SIB)) directly to the IoE devices 1124 and 1126, along with the secondary relay synchronization signal (SRSS) without the IoE devices 1124 and 1126 establishing initial PSS/SSS synchronization with the node 1102, and before the IoE devices 1124 and 1126 may be associated with the IoE device 1122. In this exemplary embodiment, the relay IoE device 1122 may appear as a base station to the edge IoE devices 1124 and 1126 to the extent of providing initial synchronization and system information (SIB, MIB) to the edge IoE devices 1124 and 1126, which may not be able to synchronize to the base station independently.

In an exemplary embodiment, the PSS/SSS that carries the initial sync/MIB/SIB signals can occur at a different period than the SRSS. In an exemplary embodiment where the initial sync/MIB/SIB signals are sent by the relay IoE device 1122 at the same or more frequent period than the SRSS, a separate SRSS may be omitted, as the initial sync/MIB/SIB signals are a superset comprising both synchronization and system information. In this exemplary embodiment, the determination of whether the relay IoE device 1122 would send both the initial sync/MIB/SIB signals and the SRSS to the edge IoE devices 1124 and 1126 is based on overall system optimization.

FIG. 12 is a timing diagram 1200 in accordance with various aspects of the present disclosure. The timing diagram 1200 shows a base station (eNB, gNB) timeline 1202 during which initial synchronization signals, such as PSS/SSS signals, are transmitted by a base station with an exemplary period of 5 ms, meaning that the PSS/SSS signals may be sent every 5 ms. The timing diagram 1200 also shows a relay IoE device timeline 1212 and an edge IoE device timeline 1222. The relay IoE device timeline 1212 shows receipt of the PSS/SSS signals 1214 from the base station, and the edge IoE device timeline 1222 shows receipt of the PSS/SSS signals 1224 from the base station. The timelines 1202, 1212 and 1222 show a base station primary synchronization 1226 with IoE devices, exemplary ones of which may be a relay IoE device and an edge IoE device. A base station continually transmits the PSS/SSS signals 1204, and the IoE devices continually receive the PSS/SSS signals 1214 and 1224, to maintain continuous timing synchronization. When a relay IoE device and an edge IoE device are synchronized to a base station, the relay IoE device and the edge IoE device are also synchronized to each other.

The timing diagram 1200 also shows a relay IoE device discovery signal timeline 1232 showing the transmission by a relay IoE device of discovery signals 1234.

The timing diagram 1200 also shows an edge IoE device discovery signal timeline 1242 showing the reception by an edge IoE device of discovery signals 1234 transmitted by a relay IoE device. In an exemplary embodiment, upon receipt of a discovery signal 1244 by an edge IoE device, the edge IoE device will "discover" and "associate" with the relay IoE device. In an exemplary embodiment, the edge IoE device may transmit a discovery signal 1245 to the relay IoE device to complete the association.

The timing diagram 1200 also shows a relay IoE device secondary relay synchronization signal (SRSS) timeline 1252. The relay IoE device SRSS timeline 1252 shows the periodic transmission of SRSS signals 1254, 1255 and 1257, having a period that is significantly longer than the period of the PSS/SSS signals 1204 sent by the base station. In an exemplary embodiment, the period of the SRSS signals 1254, 1255 through 1257 may be, for example, 60 s, or another period longer than the period of the PSS/SSS signals 1204 sent by the base station. The term "longer period" refers to the period of the SRSS signals 1254, 1255 through 1257, in this example, being sent significantly less frequently than the PSS/SSS signals 1204 sent by the base station. Although a period of the SRSS signals 1254, 1255 through 1257, in this example, is mentioned to be 60 s, other periods of the SRSS signals 1254, 1255 through 1257, in this example, is contemplated, such that the period of the SRSS signals 1254, 1255 through 1257, in this example, is longer than the period of the PSS/SSS signals 1204.

The timing diagram 1200 also shows an edge IoE device SRSS signal timeline 1262. The edge IoE device SRSS signal timeline 1262 shows received SRSS signals 1264, 1265 through 1267. In an exemplary embodiment, because the edge IoE device may have been in a power saving mode (such as a sleep or dormant state), the expanded search window 1268 used by an edge IoE device to search for an SRSS signal may be considerably longer than a search window used by an edge IoE device to search for the PSS/SSS signals from a base station. In an exemplary embodiment, once an edge IoE device acquires an SRSS signal 1255, shown as edge IoE device received SRSS signal 1265 on the edge IoE device timeline 1262, at point 1256, the edge IoE device synchronizes with a relay IoE device.

The timing diagram 1200 also shows an edge IoE device transmission timeline 1272. At the point 1256, the edge IoE device may synchronize with the relay IoE device and initiate a transmission during period 1274, during which the edge IoE device relays its data through the relay IoE device. After the period 1274, the length of which is determined by the amount of data that the edge IoE device transmits to the relay IoE device, the edge IoE device may enter a power saving state 1275, during which the edge IoE device reduces power consumption until such time that it desires to again transmit data to a relay IoE device. For example, after the power saving state 1275, an edge IoE device may open a new extended search window 1269 to search for and receive an SRSS signal 1257 from the relay IoE device (shown as received SRSS signal 1267 on the edge IoE device timeline 1262), thus allowing the edge IoE device to again synchronize with the relay IoE device, and allow the edge IoE device to transmit data to the relay IoE device during the time period 1276.

Figure 13:
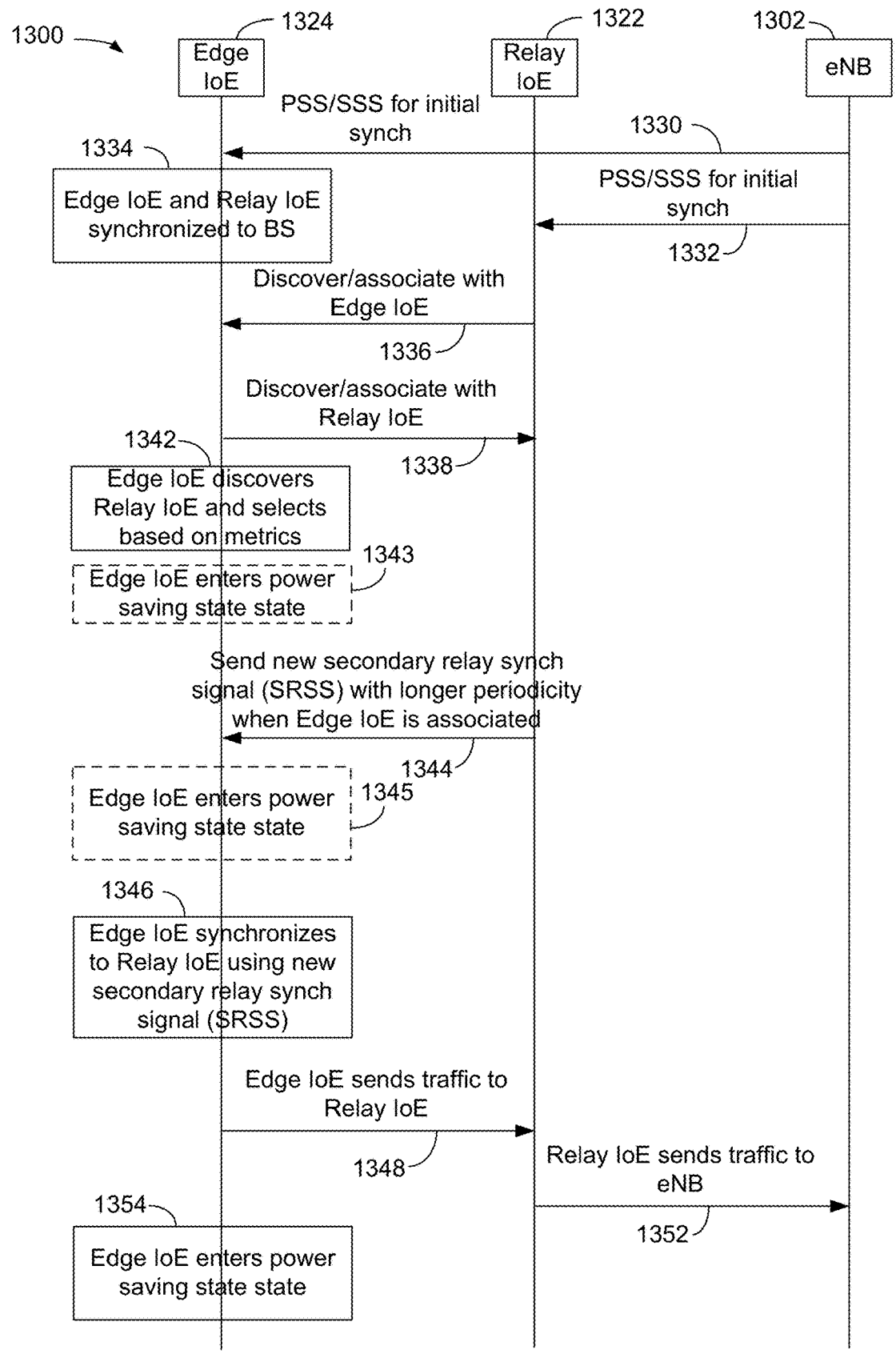
FIG. 13 is a call flow diagram in accordance with various aspects of the present disclosure.

FIG. 13 is a call flow diagram 1300 in accordance with various aspects of the present disclosure. The call flow diagram 1300 shows a base station (eNB, gNB, etc.) 1302, a relay IoE device 1322 and an edge IoE device 1324. In an exemplary embodiment, the base station 1302 may be an exemplary embodiment of the base station 610 (FIG. 6) and the IoE devices 1322 and 1324, may be exemplary embodiments of the UE 650 (FIG. 6).

In calls 1330 and 1332, the base station 1302 sends PSS/SSS synchronization signals to the edge IoE device 1324 and to the relay IoE device 1322.

In block 1334, the relay IoE device 1322 and the edge IoE device 1324 are synchronized to the base station 1302. The block 1334 shows the base station 1302 having primary synchronization with the relay IoE device 1322 and with the edge IoE device 1324. The base station 1302 continually transmits the PSS/SSS signals and the IoE devices 1322 and 1324 may continually receive the PSS/SSS signals to maintain continuous timing synchronization. Alternatively, one or more of the relay IoE device 1322 and the edge IoE device 1324 may not be continually associated with the base station 1302, but may periodically synchronize to the base station 1302 as needed. When the relay IoE device 1322 and the edge IoE device 1324 are synchronized to the base station 1302, the relay IoE device 1322 and the edge IoE device 1324 are also synchronized to each other.

In call 1336, the relay IoE device 1322 sends a broadcast message having discovery signals to all IoE devices, including to the edge IoE device 1324.

In call 1338, the edge IoE device 1324 receives the discovery signals transmitted by the relay IoE device 1322 and the edge IoE device 1324 will discover and associate with the relay IoE device 1322. In an exemplary embodiment, the edge IoE device 1324 may transmit a discovery signal to the relay IoE device 1322 to complete the association.

In block 1342 the edge IoE device 1324 discovers the relay IoE device 1322 and associates with the relay IoE device 1322 based on certain metrics. The metrics may include, for example, the relay IoE device's quality of connection with the base station 1302, the state of the battery, or other power system of the edge IoE device 1324 and the relay IoE device 1322, the relay IoE device's load from other edge IoE devices, one or more configuration parameters of the base station 1302, and other metrics. If no data transmission is anticipated, the edge IoE device 1324 may enter a power saving state, shown in dotted block 1343.

In call 1344, the relay IoE device 1322 periodically broadcasts SRSS signals to all edge IoE devices, including edge IoE device 1324. The SRSS is a broadcast message and is not directed to any specific edge IoE device. In an exemplary embodiment, the relay IoE device 1322 sends the SRSS only if there is at least one associated edge IoE device, such as edge IoE device 1324, associated with the relay IoE device 1322 in this example. The relay IoE device 1322 sending the SRSS in this example can be considered to be "on-demand" in the sense that the relay IoE device 1322 sends the SRSS only if at least one edge IoE device is associated with the relay IoE device 1322. In this exemplary embodiment, the relay IoE device 1322 sends only one such SRSS broadcast even if more than one edge IoE device is associated with the relay IoE device 1322. Indeed, thereafter, the SRSS is broadcast periodically, until the relay IoE device 1322 determines that there are no associated edge IoE devices. In an exemplary embodiment, the SRSS signals may have a period of, for example, 60 s, or another period that is longer than the period of the PSS/SSS signals 1204 (FIG. 12) sent by the base station and may be sent "on-demand," as described above. As used herein, the term "on-demand" refers to a relay IoE device 1322 sending the SRSS signals to an edge IoE device 1324 only when the edge IoE device 1324 (or any other edge IoE devices) associates with the relay IoE device 1322. In an exemplary embodiment, in a situation in which a relay IoE device has at least one associated edge IoE device configured to receive the SRSS, if the associated edge IoE device can decode a base station's PSS/SSS signals without significant energy overhead, then the edge IoE device may not benefit from the relay IoE device sending the SRSS. For example, a relay IoE device, such as the relay IoE device 1322, may be powered by a battery, or other renewable or rechargeable, power source. If the relay IoE device 1322 is battery powered, then sending the SRSS consumes battery power. Accordingly, even if an edge IoE device, such as the edge IoE device 1324, may benefit from associating with the relay IoE device 1322, and synchronizing using the SRSS in some situations, the determination of whether the benefit of using the SRSS for synchronization is sufficient to justify the overhead expense at the relay IoE device 1322 becomes a system optimization determination. For example, the base station 1302, the relay IoE device 1322 and the edge IoE device 1324 are analyzed together to determine whether the location and connectivity of the edge IoE device 1324 justify the overhead associated with the relay IoE device 1322 sending the SRSS.

In block 1345, if the edge IoE device 1324 has no data to send at this time, the edge IoE device 1324 may enter, or remain in, a power saving state until it has data to send. The block 1345 is shown in dotted line to indicate that if the edge IoE device 1324 has data to send at this time, it would proceed to block 1346.

In block 1346, the edge IoE device 1324 synchronizes to the relay IoE device 1324 using the SRSS signals received in the expanded search window (1268, FIG. 12). If the edge IoE device 1324 had been in a power saving state (such as in block 1345), the edge IoE device would awaken when it has data to send, and would search for the SRSS signals using its expanded search window 1268 (FIG. 12) to search for the SRSS signals.

In call 1348, the edge IoE device 1324 sends data communication to the relay IoE device 1322.

In call 1352, the relay IoE device 1322 sends, or relays, the data transmission to the base station 1302.

In block 1354, the edge IoE device enters a power saving state until the next time it determines that it has data to send to the base station 1302 via the relay IoE device 1322.

Figure 14:
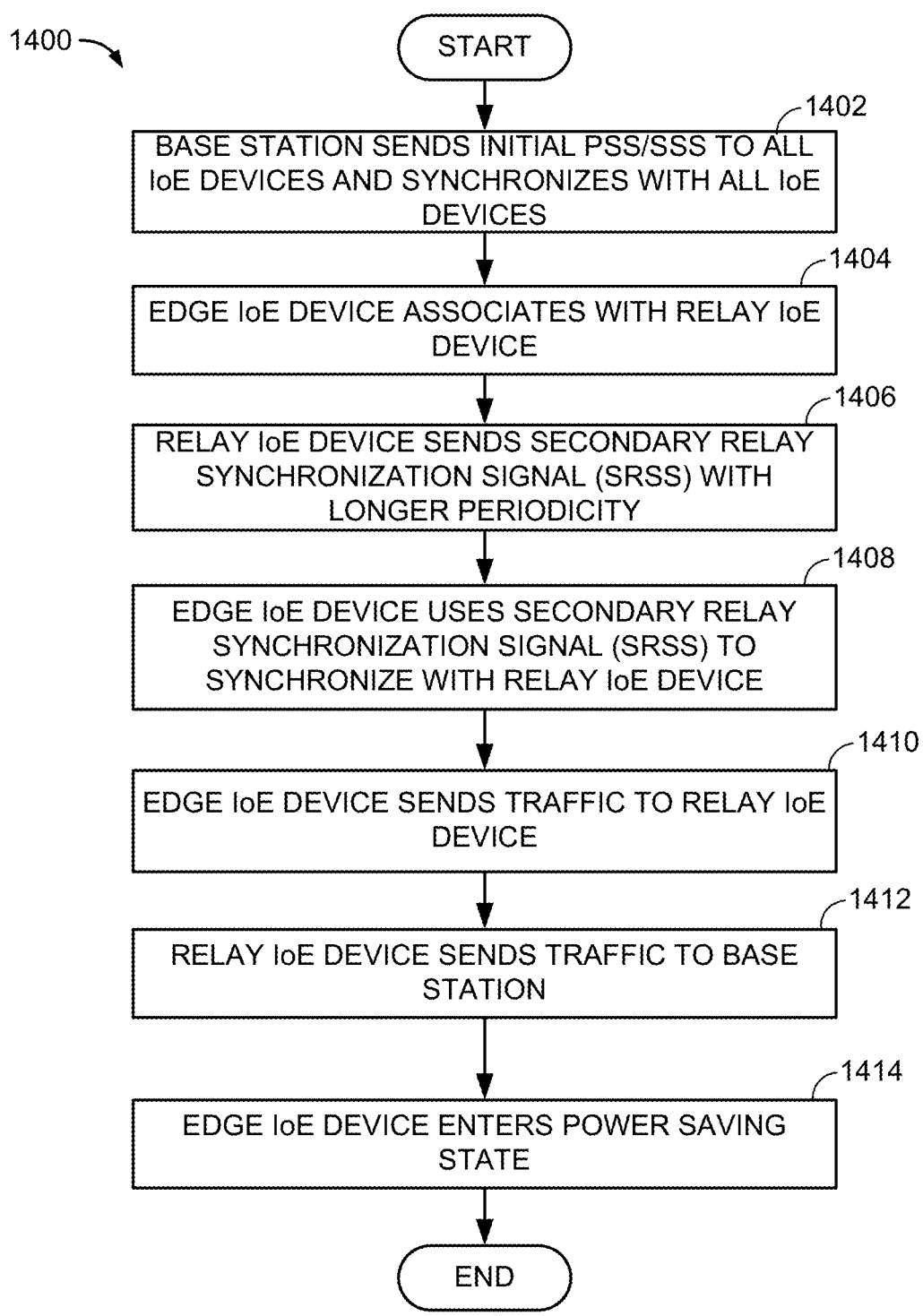
FIG. 14 is a flow chart illustrating an example of a method for communication, in accordance with various aspects of the present disclosure.

FIG. 14 is a flow chart illustrating an example of a method for communication, in accordance with various aspects of the present disclosure. The blocks in the method 1400 can be performed in or out of the order shown, and in some embodiments, can be performed at least in part in parallel.

In block 1402, a base station sends PSS/SSS synchronization signals to an edge IoE device and to a relay IoE device. The edge IoE device and the relay IoE device synchronize to the base station, and to each other. For example, the base station 1302 sends PSS/SSS synchronization signals to the edge IoE device 1324 and to the relay IoE device 1322. The edge IoE device 1324 and the relay IoE device 1322 synchronize to the base station 1302 and synchronize to each other.

In block 1404, an edge IoE device associates with a relay IoE device. For example, the relay IoE device 1322 sends discovery signals to all IoE devices, including to the edge IoE device 1324. The edge IoE device 1324 receives the discovery signals transmitted by the relay IoE device 1322 and the edge IoE device 1324 will discover and associate with the relay IoE device 1322. In an exemplary embodiment, the edge IoE device 1324 may transmit a discovery signal to the relay IoE device 1322 to complete the association.

In block 1406, a relay IoE device sends secondary relay synchronization signals (SRSS) having a period longer than a period of the PSS/SSS signals sent in block 1402. For example, the relay IoE device 1322 periodically broadcasts SRSS signals to the edge IoE device 1324. The SRSS signals may have a period of, for example, 60 s, or another period longer than the period of the PSS/SSS signals, and may be sent "on-demand." As used herein, the term "on-demand" refers to a relay IoE device 1322 sending the SRSS signals to an edge IoE device 1324 only when an edge IoE device, such as the edge IoE device 1324, associates with the relay IoE device 1322.

In block 1408, an edge IoE device uses the SRSS signals to synchronize to a relay IoE device. For example, the edge IoE device 1324 synchronizes to the relay IoE device 1324 using the SRSS signals received in the expanded search window (1268, FIG. 12).

In block 1410, an edge IoE device sends data to a relay IoE device. For example, the edge IoE device 1324 sends data communication to the relay IoE device 1322.

In block 1412 a relay IoE device forwards, or relays, the data from the edge IoE device to a base station. For example, the relay IoE device 1322 sends, or relays, the data transmission to the base station 1302.

In block 1414, an edge IoE device enters a power saving state. For example, the edge IoE device 1324 enters a power saving state until the next time it determines that it has data to send to the base station 1032 via the relay IoE device 1322.

Figure 15:
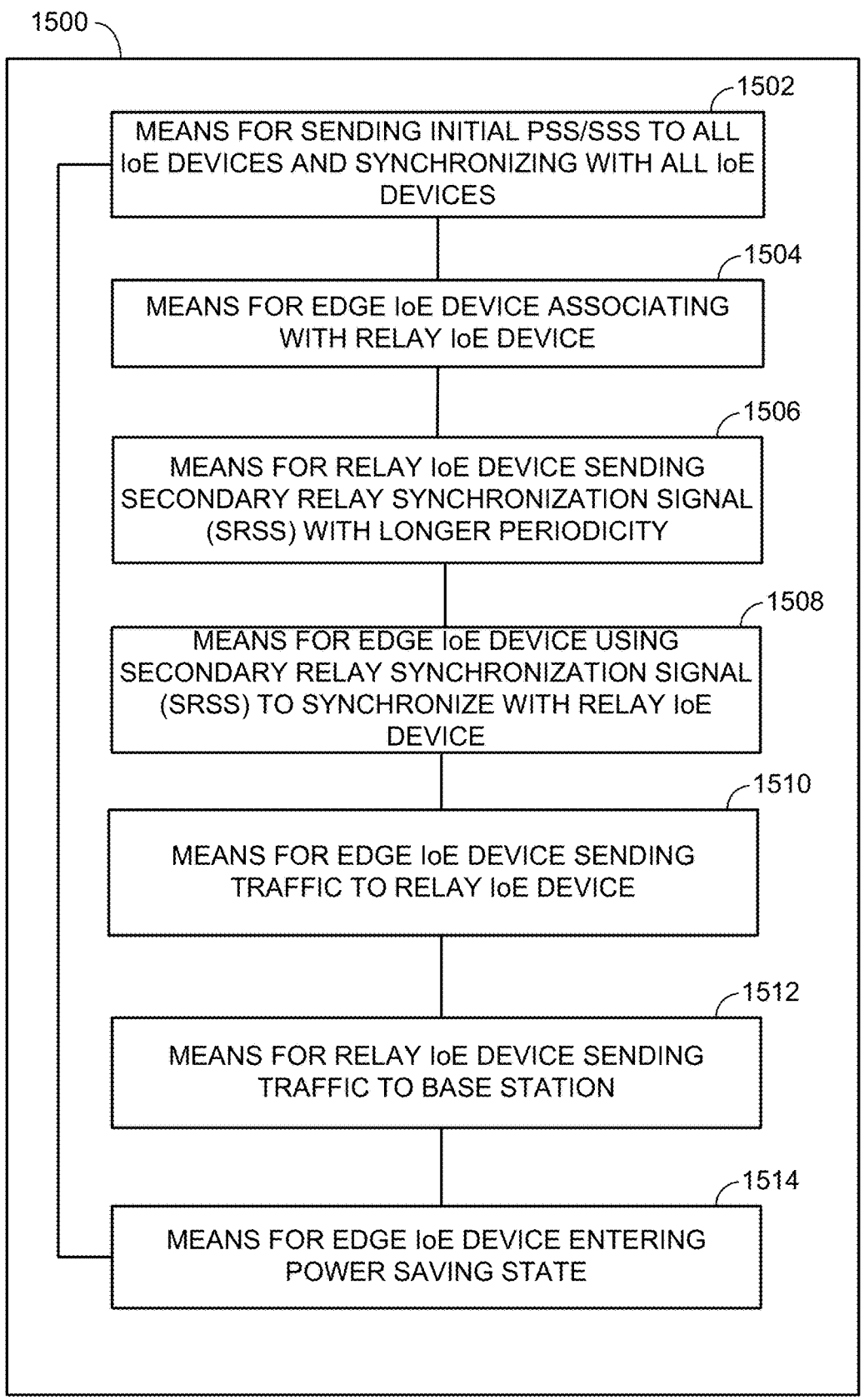
FIG. 15 is a functional block diagram of an apparatus in accordance with an exemplary embodiment of the disclosure.

FIG. 15 is a functional block diagram of an apparatus 1500 in accordance with an exemplary embodiment of the disclosure. The apparatus 1500 comprises means 1502 for sending an initial PSS/SSS synchronization signal to all IoE devices and synchronizing with all IoE devices. In certain embodiments, the means 1502 for sending an initial PSS/SSS synchronization signal to all IoE devices and synchronizing with all IoE devices can be configured to perform one or more of the functions described in operation block 1402 of method 1400 (FIG. 14). In an exemplary embodiment, the means 1502 for sending an initial PSS/SSS synchronization signal to all IoE devices and synchronizing with all IoE devices may comprise edge IoE device 1324 and the relay IoE device 1322 synchronizing to the base station 1302 and synchronizing to each other.

The apparatus 1500 further comprises means 1504 for an edge IoE device associating with a relay IoE device. In certain embodiments, the means 1504 for an edge IoE device associating with a relay IoE device can be configured to perform one or more of the functions described in operation block 1404 of method 1400 (FIG. 14). In an exemplary embodiment, the means 1504 for an edge IoE device associating with a relay IoE device may comprise the relay IoE device 1322 sending discovery signals to all IoE devices, including to the edge IoE device 1324. The edge IoE device 1324 receives the discovery signals transmitted by the relay IoE device 1322 and the edge IoE device 1324 will "discover" and "associate" with the relay IoE device 1322. In an exemplary embodiment, the edge IoE device 1324 may transmit a discovery signal to the relay IoE device 1322 to complete the association.

The apparatus 1500 further comprises means 1506 for a relay IoE device sending a secondary relay synchronization (SRSS) signal with period longer than the period of the PSS/SSS signal. In certain embodiments, the means 1506 for a relay IoE device sending a SRSS signal with period longer than the period of the PSS/SSS signal can be configured to perform one or more of the functions described in operation block 1406 of method 1400 (FIG. 14). In an exemplary embodiment, the means 1506 for a relay IoE device sending a SRSS signal with period longer than the period of the PSS/SSS signal may comprise the relay IoE device 1322 periodically sending SRSS signals on demand to associated edge IoE devices, such as the edge IoE device 1324.

The apparatus 1500 further comprises means 1508 for an edge IoE device using the SRSS signal to synchronize with a relay IoE device. In certain embodiments, the means 1508 for an edge IoE device using the SRSS signal to synchronize with a relay IoE device can be configured to perform one or more of the functions described in operation block 1408 of method 1400 (FIG. 14). In an exemplary embodiment, the means 1508 for an edge IoE device using the SRSS signal to synchronize with a relay IoE device may comprise the edge IoE device 1324 synchronizing to the relay IoE device 1324 using the SRSS signals received in the expanded search window (1268, FIG. 12).

The apparatus 1500 further comprises means 1510 for an edge IoE device sending traffic to a relay IoE device. In certain embodiments, the means 1510 for an edge IoE device sending traffic to a relay IoE device can be configured to perform one or more of the functions described in operation block 1410 of method 1400 (FIG. 14). In an exemplary embodiment, the means 1510 for an edge IoE device sending traffic to a relay IoE device may comprise the edge IoE device 1324 sending data communication to the relay IoE device 1322.

The apparatus 1500 further comprises means 1512 for a relay IoE device sending traffic to a base station. In certain embodiments, the means 1512 for a relay IoE device sending traffic to a base station can be configured to perform one or more of the functions described in operation block 1412 of method 1400 (FIG. 14). In an exemplary embodiment, the means 1512 for a relay IoE device sending traffic to a base station may comprise the relay IoE device 1322 sending, or relaying, the data transmission to the base station 1302.

The apparatus 1500 further comprises means 1514 for an edge IoE device entering a power saving state. In certain embodiments, the means 1514 for an edge IoE device entering a power saving state can be configured to perform one or more of the functions described in operation block 1414 of method 1400 (FIG. 14). In an exemplary embodiment, the means 1514 for an edge IoE device entering a power saving state may comprise the edge IoE device 1324 entering a power saving state until the next time it determines that it has data to send to the base station 1032 via the relay IoE device 1322.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for communication by an edge communication device with a network via a relay communication device, the method comprising:
   synchronizing to a network using an initial synchronization signal;
   associating with a relay communication device, the relay communication device synchronized to the network using the initial synchronization signal;
   entering a power saving state;
   awakening from the power saving state;
   searching for a periodic secondary relay synchronization signal (SRSS) transmitted by the relay communication device using an SRSS search window having a duration longer than a duration of a network search window for searching for the initial synchronization signal, the SRSS sent continually as one broadcast by the relay communication device on-demand to the edge communication device after the edge communication device associates with the relay communication device;
   synchronizing to the relay communication device based on the SRSS; and
   transmitting data to the relay communication device based on the synchronizing to enable the relay communication device to relay the data to the network.

2. The method of claim 1, wherein the periodic SRSS has a period of 60 seconds (s).

3. The method of claim 1, wherein the edge communication device is an edge Internet of everything (IoE) communication device and the relay communication device is a relay IoE communication device.

4. The method of claim 1, further comprising receiving from the relay communication device a primary synchronization signal (PSS) or secondary synchronization signal (SSS) prior to the edge communication device searching for the periodic SRSS, wherein the initial synchronization signal comprises the PSS or SSS.

5. The method of claim 1, wherein the edge communication device receives the periodic SRSS sent one time within a predefined time period from the relay communication device.

6. The method of claim 1, wherein associating with the relay communication device comprises associating with the relay communication device based on one or more metrics.

7. The method of claim 6, wherein the one or more metrics include a connection quality associated with the relay communication device, a communication load associated with the relay communication device, a power level of the relay communication device, and a power level of the edge communication device.

8. An edge communication device capable of communicating with a network via a relay communication device, the edge communication device comprising:
a processor;
a memory in communication with the processor, wherein the processor and the memory are configured to:
synchronize to a network using an initial synchronization signal;
associate with the relay communication device, the relay communication device synchronized to the network using the initial synchronization signal;
enter a power saving state;
awaken from the power saving state;
search for a periodic secondary relay synchronization signal (SRSS) transmitted by the relay communication device using an SRSS search window having a duration longer than a duration of a network search window for searching for the initial synchronization signal, the SRSS sent continually as one broadcast by the relay communication device on-demand to the edge communication device after the edge communication device associates with the relay communication device;
synchronize to the relay communication device based on the SRSS; and
transmit data to the relay communication device based on the synchronizing to enable the relay communication device to relay the data to the network.

9. The edge communication device of claim 8, wherein the periodic SRSS has a period of 60 seconds (s).

10. The edge communication device of claim 8, wherein the edge communication device is an edge Internet of everything (IoE) communication device and the relay communication device is a relay IoE communication device.

11. The edge communication device of claim 8, the processor and the memory are further configured to receive from the relay communication device a primary synchronization signal (PSS) or secondary synchronization signal (SSS) prior to searching for the periodic SRSS, wherein the initial synchronization signal comprises the PSS or SSS.

12. The edge communication device of claim 8, wherein the processor and the memory are configured to receive the periodic SRSS sent one time within a predefined time period from the relay communication device.

13. The edge communication device of claim 8, wherein the processor and the memory are configured to associate with the relay communication device based on one or more metrics.

14. The edge communication device of claim 13, wherein the one or more metrics include a connection quality associated with the relay communication device, a communication load associated with the relay communication device, a power level of the relay communication device, and a power level of the edge communication device.

15. An edge communication device, comprising:
means for synchronizing to a network using an initial synchronization signal;
means for associating with a relay communication device, the relay communication device synchronized to the network using the initial synchronization signal;
means for entering a power saving state;
means for awakening from the power saving state;
means for searching for a periodic secondary relay synchronization signal (SRSS) transmitted by the relay communication device using an SRSS search window having a duration longer than a duration of a network search window for searching for the initial synchronization signal, the SRSS sent continually as one broadcast by the relay communication device on-demand to the edge communication device after the edge communication device associates with the relay communication device;
means for synchronizing to the relay communication device based on the SRSS; and
means for transmitting data to the relay communication device based on the synchronizing to enable the relay communication device to relay the data to the network.

16. The device of claim 15, wherein the periodic SRSS has a period of 60 seconds (s).

17. The device of claim 15, wherein the edge communication device is an edge Internet of everything (IoE) communication device and the relay communication device is a relay IoE communication device.

18. The device of claim 15, further comprising means for receiving from the relay communication device a primary synchronization signal (PSS) or secondary synchronization signal (SSS) prior to searching for the SRSS, wherein the initial synchronization signal comprises the PSS or SSS.

19. The device of claim 15, wherein the means for searching for the periodic SRSS searches for the periodic SRSS sent one time within a predefined time period from the relay communication device.

20. The device of claim 15, wherein the means for associating with the relay communication device comprises means for selecting the relay communication device based on one or more metrics.

21. The device of claim 20, wherein the one or more metrics include a connection quality associated with the relay communication device, a communication load associated with the relay communication device, a power level of the relay communication device, and a power level of the communication means.

22. A non-transitory computer-readable medium storing computer executable code for communication by an edge communication device with a network via a relay communication device, the code executable by a processor to:
synchronize to a network using an initial synchronization signal;
associate with a relay communication device, the relay communication device synchronized to the network using the initial synchronization signal;
enter a power saving state;
awaken from the power saving state;
search for a periodic secondary relay synchronization signal (SRSS) transmitted by the relay communication device using an SRSS search window having a duration longer than a duration of a network search window for searching for the initial synchronization signal, the SRSS sent continually as one broadcast by the relay communication device on-demand to the edge communication device after the edge communication device associates with the relay communication device;
synchronize to the relay communication device based on the SRSS; and transmit data to the relay communication device based on the synchronizing to enable the relay communication device to relay the data to the network.

23. The non-transitory computer-readable medium of claim 22, wherein the periodic SRSS has a period of 60 seconds (s).

24. The non-transitory computer-readable medium of claim 22, wherein the edge communication device is an edge Internet of everything (IoE) communication device and the relay communication device is a relay IoE communication device.

25. The non-transitory computer-readable medium of claim 22, wherein the code is executable by a processor to cause the edge communication device to receive a primary synchronization signal (PSS) or secondary synchronization signal (SSS) prior to the edge communication device searching for the periodic SRSS, wherein the initial synchronization signal comprises the PSS or SSS.

26. The non-transitory computer-readable medium of claim 22, wherein the code is executable by a processor to cause the edge communication device to receive the periodic SRSS sent one time within a predefined time period from the relay communication device.

27. The non-transitory computer-readable medium of claim 22, wherein the code is executable by a processor to cause the edge communication device to select the relay communication device based on one or more metrics.

28. The non-transitory computer-readable medium of claim 27, wherein the one or more metrics include a connection quality associated with the relay communication device, a communication load associated with the relay communication device, a power level of the relay communication device, and a power level of the edge communication device.

* * * * *